United States Patent [19]

McKendrick

[11] Patent Number: 5,412,877
[45] Date of Patent: * May 9, 1995

[54] FIXTURE GAUGE AND METHOD OF MANUFACTURING SAME

[76] Inventor: Blair T. McKendrick, 29684 Kenloch Dr., Farmington Hills, Mich. 48331

[*] Notice: The portion of the term of this patent subsequent to May 11, 2010 has been disclaimed.

[21] Appl. No.: 62,903

[22] Filed: May 11, 1993

Related U.S. Application Data

[63] Continuation-in-part of Ser. No. 858,877, Mar. 27, 1992, Pat. No. 5,208,995.

[51] Int. Cl.⁶ ............................................. G01B 5/20
[52] U.S. Cl. ...................................... 33/567; 33/545; 33/549; 33/529
[58] Field of Search .............. 33/567, 568, 501.05, 33/502, 503, 545, 549, 550, 551, 553, 555, 529

[56] References Cited

U.S. PATENT DOCUMENTS

| | | | |
|---|---|---|---|
| 3,203,100 | 8/1965 | Hegedus | 33/549 |
| 3,537,697 | 11/1970 | Davis | 33/549 |
| 4,593,476 | 6/1986 | Clark et al. | 33/568 |
| 5,193,286 | 3/1993 | Collier | 33/503 |
| 5,208,995 | 5/1993 | McKendrick | 33/567 |
| 5,231,749 | 8/1993 | Hutchison | 33/567 |
| 5,234,295 | 8/1993 | Jackson et al. | 33/567 |

*Primary Examiner*—Christopher Fulton
*Attorney, Agent, or Firm*—Dykema Gossett

[57] ABSTRACT

A fixture type gauge (20) includes a base (22) and a plurality of segment blocks (1–12) mounted on the base (22) configured and arranged to allow comparison of manufactured parts (46) with a reference standard. Under computer control, reference marks (36, 54, 56, etc.) and data (26) are laser etched on the gauge base and segment blocks to facilitate rapid, accurate assembly of the gauge parts and provide a permanent record on the gauge of part related information. Laser machined alignment holes (30, 32) in the gauge base establish a reference axis on the base which can then be used to physically align the gauge with an independent spatial coordinate system, such as that of a coordinate measuring machine.

22 Claims, 18 Drawing Sheets

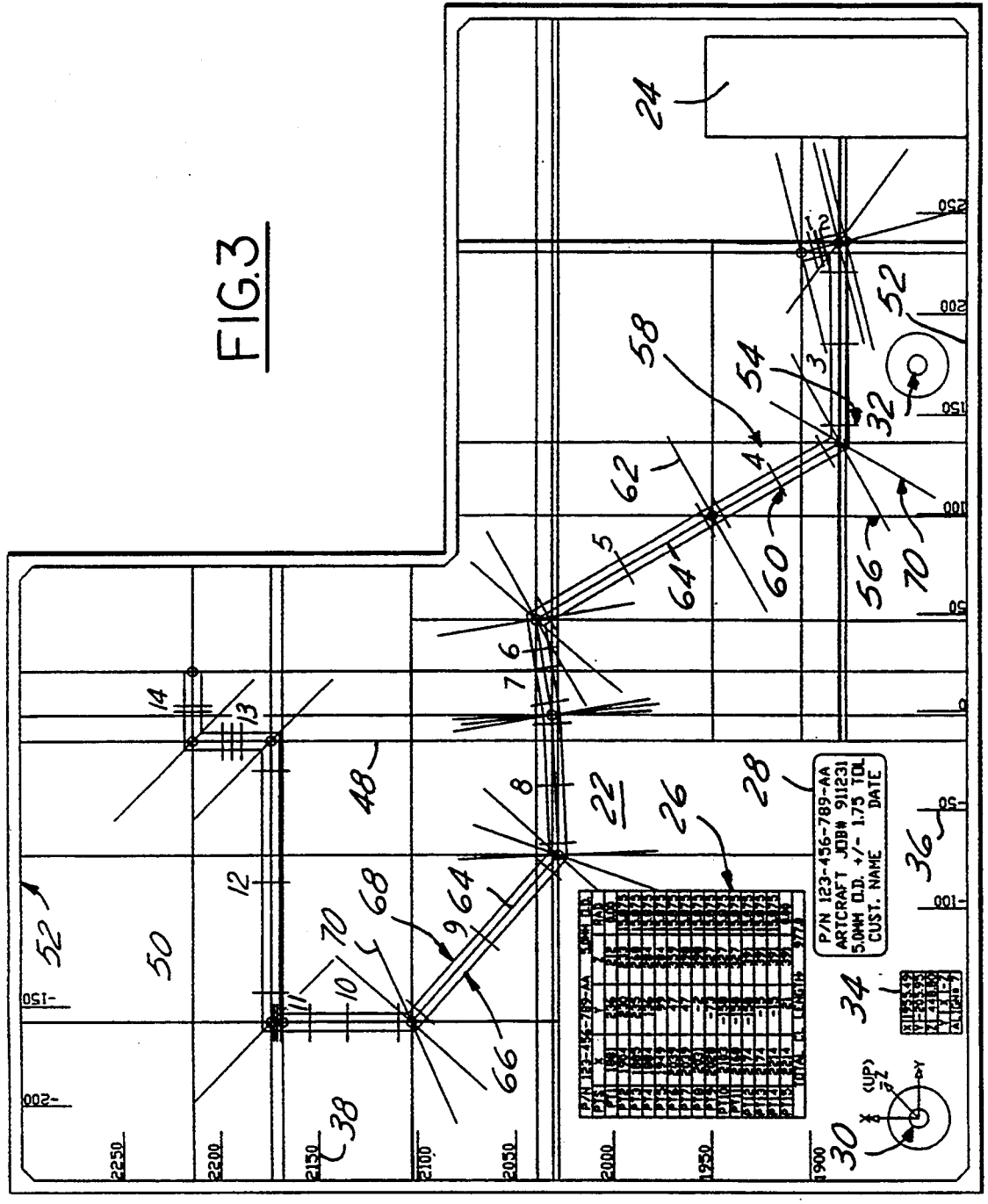

| P/N 93BB-2L111-CC | | | 4.75 O.D. | |
|---|---|---|---|---|
| PTS | X | Y | Z | RAD |
| AL1 | 4164.0 | 461.0 | 508.0 | 0.00 |
| AL2 | 4187.0 | 455.0 | 529.0 | 15.0 |
| AL3 | 4168.0 | 460.0 | 564.0 | 15.0 |
| AL4 | 4167.0 | 361.0 | 580.0 | 15.0 |
| AL5 | 4232.0 | 324.0 | 580.0 | 15.0 |
| AL6 | 4322.0 | 272.0 | 655.0 | 15.0 |
| AL7 | 4322.0 | 272.0 | 694.0 | 15.0 |
| AL8 | 4314.0 | 223.0 | 694.0 | 15.0 |
| AL9 | 4311.0 | 152.0 | 623.0 | 15.0 |
| AL10 | 4386.0 | 67.0 | 623.0 | 15.0 |
| AL11 | 4451.0 | 67.0 | 623.0 | 15.0 |
| AL12 | 4457.0 | 67.0 | 687.0 | 15.0 |
| AL13 | 4457.0 | 210.0 | 687.0 | 15.0 |
| AL14 | 4497.0 | 210.0 | 687.0 | 15.0 |
| AL15 | 4497.0 | 246.0 | 687.0 | 0.00 |
| TOTAL CL LENGTH: | | | 977.0 | |

| X | 19.05 |
|---|---|
| Y | 4127.50 |
| Z | 744.80 |

FIXTURE GAUGE AND METHOD OF MANUFACTURING SAME

RELATED APPLICATIONS

This application is a continuation in part of U.S. patent application Ser. No. 07/858,877 filed Mar. 27, 1992, now U.S. Pat. No. 5,208,995.

TECHNICAL FIELD

The present invention generally relates to gauges and measuring devices, and deals more particularly with a fixture-type gauge, typically custom manufactured for determining the conformance of a plurality of manufactured parts with a reference standard.

BACKGROUND ART

One type of gauge, sometimes referred to in the art as a fixture gauge, is commonly employed to determine the conformance of one or more manufactured parts with a reference standard. For example, engine fuel lines used in automobiles typically made of metal include a number of bends and turns to accommodate the particular frame, body and engine components of a vehicle in which it is used. The features of manufactured parts, such as the fuel lines mentioned above, must be periodically compared with the reference standard corresponding to an ideal part in order to determine whether unacceptable variation in these features has occurred due to changes in material supply or manufacturing processes.

Although a number of techniques and materials are sometimes used to manufacture these gauges, one broad class comprises wooden gauges manufactured by ordinary woodworking techniques and hand tools. Typically, the woodworker is provided with a drawing of an ideal part forming the reference standard and/or a set of three-dimensional spatial coordinates and bending radii which define the standard. Using a plan view layout of the proposed gauge, the woodworker scribes reference lines on a base using a knife and may jot down a handwritten dimensions next to the associated line; this establishes features of the gauge in two dimensions on the wooden base. A vertical measuring stick is then used to determine the height of the wooden gauge blocks in a third dimension which are to be secured on the base along the previously scribed lines. The woodworker then must determine the three-dimensional intersect points on the blocks which define the reference standard, and then again record these on the blocks using a knife, ruler or the like. The three-dimensional intersect points typically may define, for example, the central axis of a tube type part. At best, the woodworker may employ a digital height gauge including a scribing apparatus adapted for measuring and marking the intersecting points on the blocks. In any event, it may be appreciated that the accuracy of such gauges is limited to the woodworker's skills in measuring and scribing lines, and his or her visual resolution of scales and measurements. Errors in this respect are common place; shadows can mislead the woodworker as to the exact placement of lines and features, and errors can easily be introduced during the process of scribing, shaping and final placement of the blocks on the gauge base. Because of the nature of the gauge making process described above, prior gauge makers necessarily require a relatively high degree of skill in the gauge making art, and typically a number of years of experience was required to reach this necessary skill level.

Another problem related to prior art gauges is that involving the time and skill required to actually align the component parts into proper relationship with each other, and then secure them in such proper spatial relationship. Typically, screws and/or glue were used, in the case of wooden gauges, to fix the component parts into proper relationship. This procedure requires some degree of skill and is time consuming.

There is therefore a clear need in the art for an improved gauge and method of manufacturing same which not only substantially reduces the time required to manufacture the gauge, but results in higher gauge accuracy. The present invention is directed towards filling this need.

SUMMARY OF THE INVENTION

According to one aspect of the invention, a method of manufacturing a gauge comprises providing a set of spatial coordinates defining a reference standard, producing a set of programmed instructions using the coordinates, automatically etching reference marks on a plurality of gauge component members using the programmed instructions, and assembling the gauge component members into fixed relationship with each other using the reference marks to align the component members relative to each other. Multi-dimensional views of the gauge component members may be generated using the programmed instructions, if desired. The gauge component members are rough cut to dimensions larger than the finished gauge members. The etching process is preferably carried out using a laser, and additional lines are preferably etched to define the outer, finished contours of the part as well as the contour lines of the component members to be gauged. The gauge parts include both a base and a plurality of segment blocks. The gauge component members are preferably etched by placing them on a "ready board" disposed on a stationary base, and moving the laser over the board to successively etch each of the members. The ready board comprises a planar member having a plurality of rectangular openings therein defining edge guides for proper placement of the members relative to the coordinate system used by the laser. A physical reference axis is established on the gauge base by forming a pair of spaced apart apertures in the base, whose centers define this reference axis. These apertures are preferably formed by first machining a pair of depressions in the base, then by securing a pair of inserts in these depressions which may be machined with high accuracy, and finally laser drilling cylindrical holes in the inserts. The cylindrical side walls of these holes may be contacted by a coordinate measuring machine used to determine the exact centers of the holes and thus, the position of the reference axis.

According to another aspect of the invention, a method is provided for manufacturing a gauge for comparing a part with a reference standard, comprising the steps of laser etching reference marks on a gauge base and a plurality of gauge segment blocks under control of a programmed set of instructions, and mounting the etched segment blocks on the base using the reference marks to align the segment blocks relative to each other on the base.

A further aspect of the invention resides in a gauge assembly for comparing a part with a reference standard, comprising a base, a plurality of segment blocks mounted on the base, means on the segment blocks for supporting the part to be gauged, and at least first and second sets of laser etched alignment marks respectively on the base and segment blocks, the first and second sets of alignment marks being respectively aligned with each other to aid in quick, accurate assembly of the parts and to verify that the segment blocks are mounted on the base in proper relationship with each other to define the reference standard.

According to still another aspect of the present invention, a gauge assembly and method for manufacturing the same is provided which further reduces assembly time and increases accuracy through the provision of snap fit connections between the component members of the gauge. Snap fit connections comprising male-like projecting tabs on certain of the component members are received within female-like openings in other component members, with tolerances that yield tight, snap fit connections. The snap fit connections may be manufactured during and using the same process to manufacture the component members themselves, e.g., laser cutting. Suitable adhesives may be applied after the components are assembled to assure that they do not become loose and remain in precise spatial relationship to each other.

Accordingly, it is an important object of the present invention to provide a fixture-type gauge which possesses greater accuracy than that heretofore achievable using conventional methods and manufacturing tools.

Another important object of the invention is to provide a method for manufacturing a gauge of the type described above which substantially reduces the number of man hours required to manufacture the gauge, which decreases the level of skill needed by the gauge maker to manufacture the gauge, and which substantially increases the quality and measuring accuracy of the gauge.

A further object of the invention is to provide a gauge and method of making same which permits additional indicia, reference marks and reference data to be etched permanently and directly on the gauge.

A still further object of the invention is to provide a gauge and method of making same as described above which allows batch processing of the various parts of the gauge during the manufacturing operation, thus simplifying and substantially reducing the time required to make the gauge, and facilitating the simultaneous manufacture of multiple gauges.

A still further object of the present invention is to provide the establishment of a permanent reference axis directly on the base of the gauge which may be subsequently used to verify the accuracy of the various features of the gauge using, for example, a coordinate measuring machine.

These, and further objects and features of the present invention will become clear, or made apparent during the course of the following description of a preferred embodiment of the invention.

BRIEF DESCRIPTION OF THE DRAWINGS

In the drawings, which form an integral part of the specification, and to be read in conjunction therewith, and in which like reference numerals are employed to designate identical components in the various views:

FIG. 3 is a plan view of the gauge base after etching, certain laser etched indicia and reference data not shown for purposes of clarity;

DETAILED DESCRIPTION OF A PREFERRED EMBODIMENT

Figure 1:
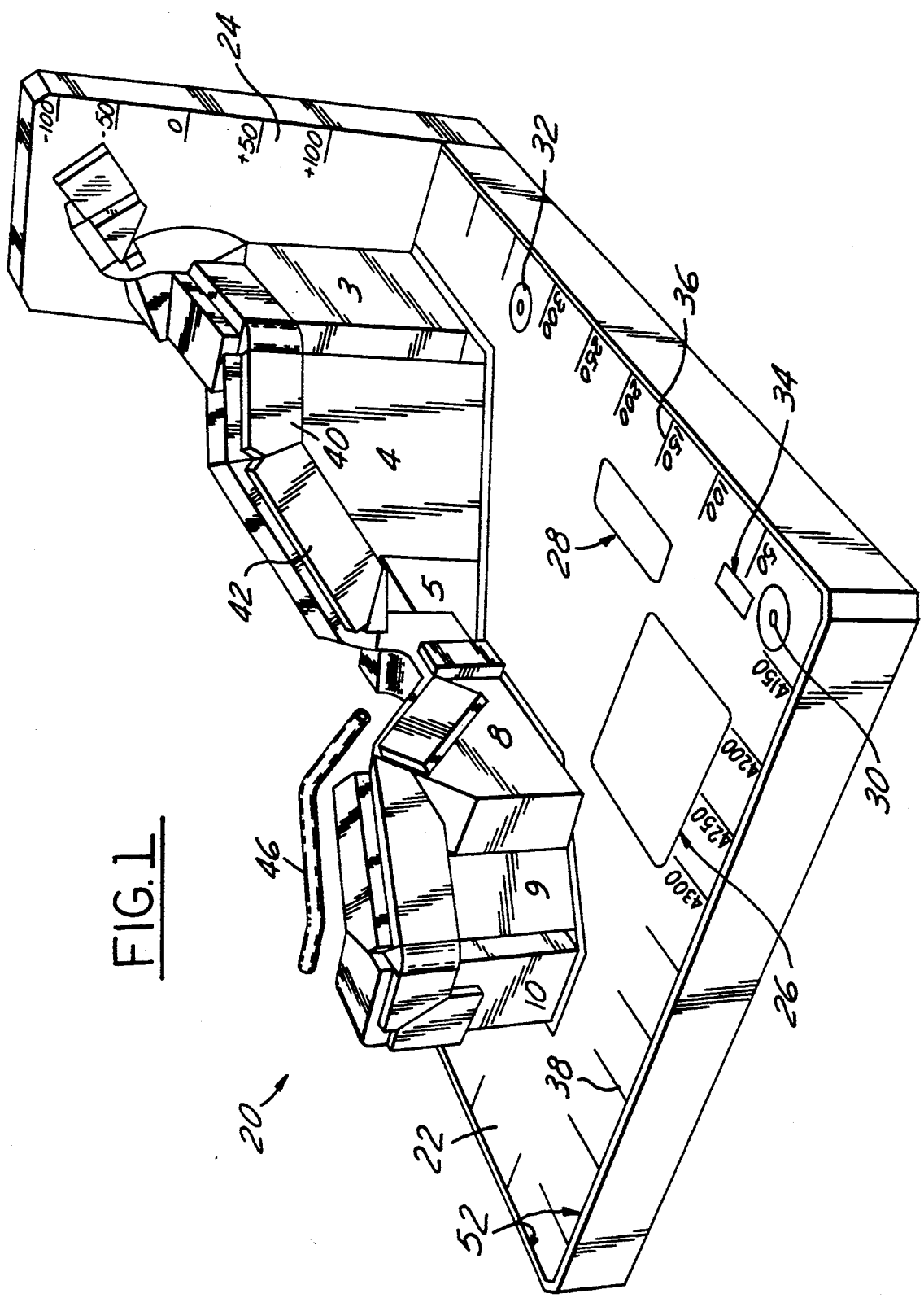
FIG. 1 is a perspective view of a fixture-type gauge manufactured by the method of the present invention, certain of the laser scribed indicia and reference marks not being shown for purposes of clarity, a tube to be checked on the gauge being shown in an elevated position.
Figure 2:
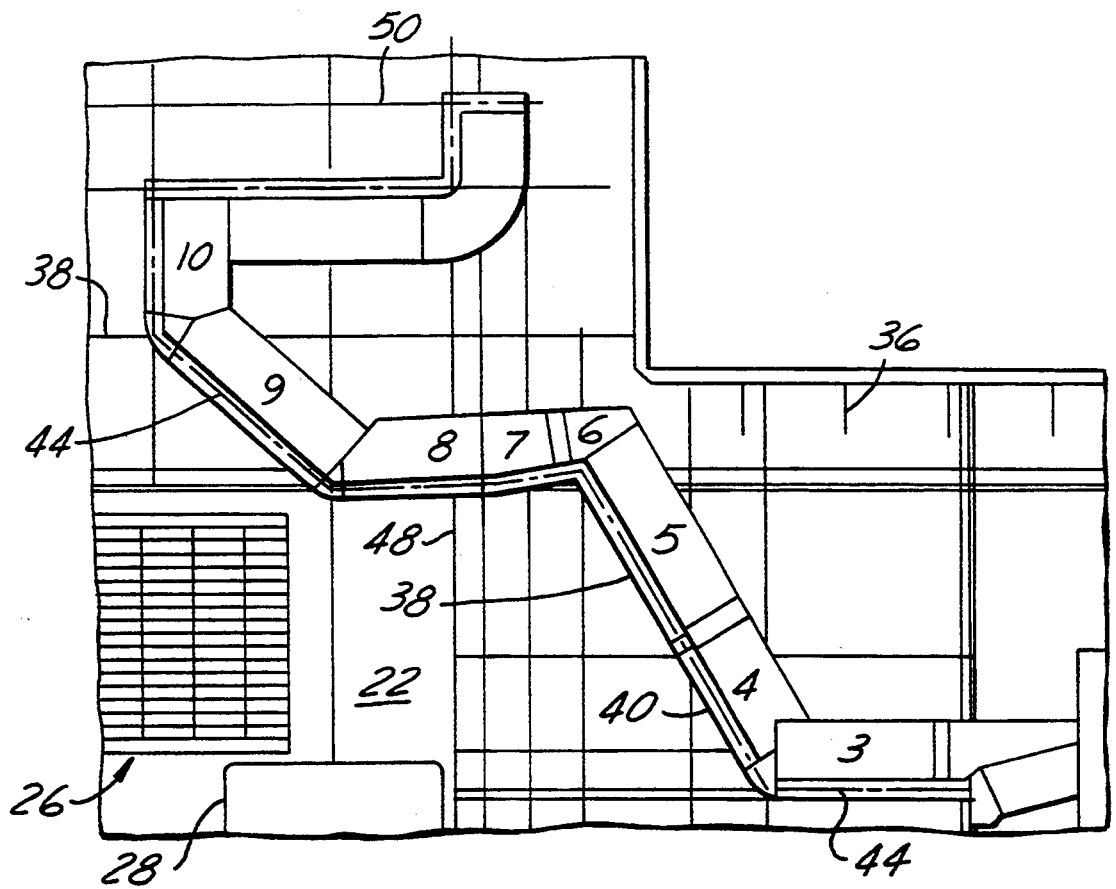
FIG. 2 is a fragmentary, plan view of a portion of the gauge shown in FIG. 1.
Figures 3A, 4:
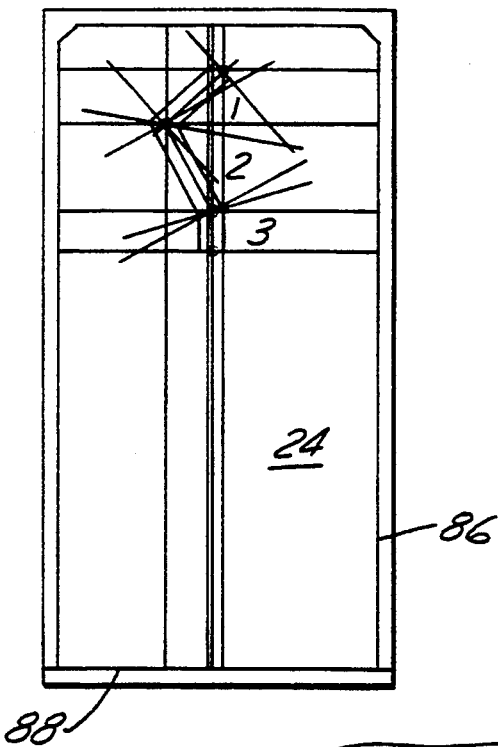
FIG. 3A is a plan view of the subbase forming part of the gauge shown in FIG. 1, following etching thereof, but before being cut to final size.
FIG. 4 is an enlarged, fragmentary view of a portion of the gauge base, depicting laser etched reference data thereon.
Figure 7:
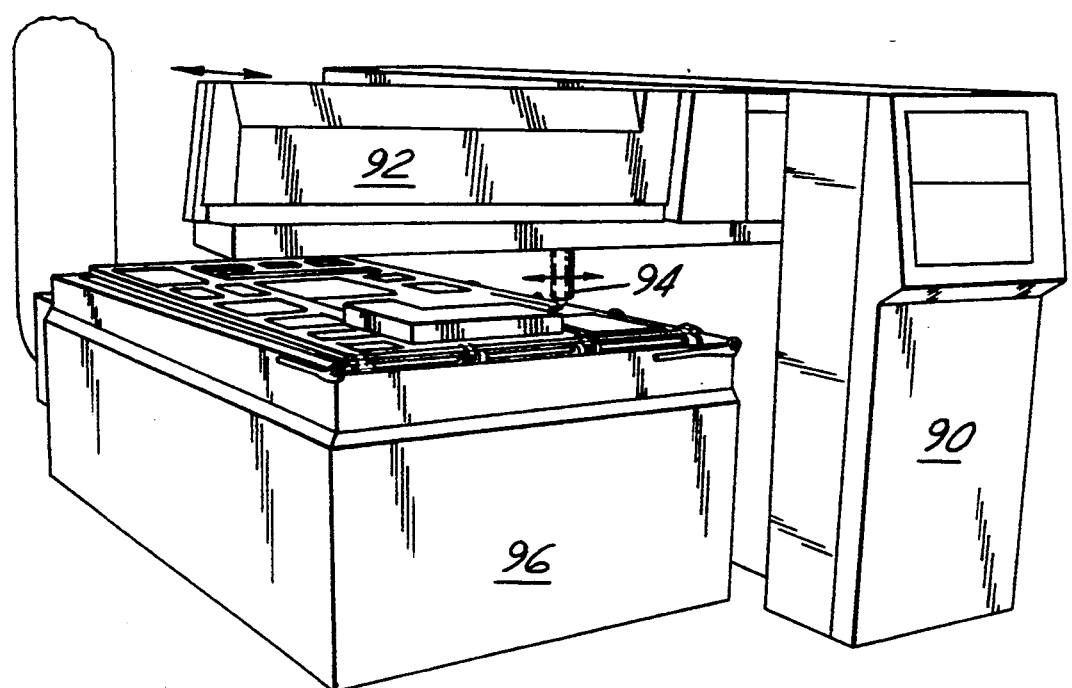
FIG. 7 is a perspective view of a laser apparatus carrying out laser etching on the gauge base.

Referring first to FIGS. 1, 2 and 4, the present invention relates to a fixture-type gauge, generally indicated by the numeral 20 in FIG. 1, as well as a method of making the gauge. The gauge 20 is manufactured according to a later discussed reference standard and is intended to compare a part, herein shown as a tube 46 for conformance of the geometry and location of its physical features with the referenced standard. Only a section of the tube 46 is shown in FIG. 1, elevated above its normal checking position, in order to better reveal the construction of gauge 20. Also not shown, but normally used, are a pair of pin center blocks mounted on the gauge 20 for engaging the opposite ends of and thus locating the tube 46 on the gauge 20.

The gauge 20 broadly comprises a generally rectangular base 22, on the upper surface of which there is mounted a plurality of segment blocks, herein designated respectively by the numerals 1-12, which numerals are etched in the lateral surfaces of the segment blocks by a later discussed laser etching process. The base 22 as well as the segment blocks 1-12 may be made of wood or other material with sufficient dimensional stability, machineability and the ability to be laser etched or cut. In the case of wood, the segment blocks 1-12 may be adhered as by gluing the same to the upper surface of the base 20 and/or screws (not shown) may be employed which extend through the base 22 into the bottom surface of the segment blocks 1-12. In the present example, due to the geometric configuration of the tube 46 being gauged, a sub-base 24 is employed which is secured to one edge of the base 22 and extends perpendicular to the top surface of the later. As best seen in FIG. 1, segment blocks 1 and 2 are secured on the sub-base 24.

A plurality of support blocks, two of these being indicated by the numerals 40 and 42 are respectively secured in precise positions on the lateral surfaces of the segment blocks 1-12, as by gluing. The support blocks 40, 42, etc. provide an underlying supporting surface extending perpendicularly from the sides of the segment blocks 1-12 in order to support the tube 46; the adjacent lateral sides of the segment blocks 1-12 provide lateral support for the tube 46 during checking. As will be explained later in more detail, each of the segment blocks 1-12 includes reference marks on the lateral surfaces thereof which, among other things, provides scribe lines for precisely positioning the support blocks 40, 42 when they are secured to the lateral surfaces and the segment blocks 1-12.

The gauge 20 includes various reference marks, indicia and reference data laser etched therein so as to become a permanent part of the gauge 20. For example, the laser etched border 52 extends around the periphery of the base 22. A plurality of X axis reference grid marks 36 are etched along one edge of the base 22, while a plurality of Y reference grid marks 36 are etched along an adjacent edge of the base 22. The reference grid marks 36, 38 provide a convenient means for precisely locating features and parts on the upper surface of the base 22. Indeed, these X, Y grid references are employed in a cross reference table 26 which is also etched in the upper surface of the base 22. As shown in FIG. 4, the reference data table 26 includes identification of the part, a plurality of intersection points (AL1-AL15) which define reference points along the central axis of the tube 46. The table 26 further includes X, Y, Z data defining each of the intersection points AL1-AL15 as well as the radius of bend of the central axis of the tube at the corresponding intersect points AL1-AL15. The X and Y data in the table 26 correspond to the X, Y reference grid defined by the reference marks 36, 38, while the Z data in table 26 corresponds to the elevation of the intersect point above the top surface of the base 22.

In addition to the above-described laser etched information, also etched in the top surface of the base 22 is an identification block 28 which uniquely identifies the gauge 20, and a data block 34 which provides the X, Y, Z coordinates of the center of a first alignment origin aperture 30, located in the top surface of the base 22, near one corner thereof, a second alignment aperture 32 being located along one adjacent edge of the base 22, in the direction of the "X" axis. As will be described later in more detail, the alignment origin apertures 30, 32 provide a means for establishing a reference axis which may be used by a coordinate measuring machine employed to verify the location and accuracy of the features of the gauge 20.

Attention is now particularly directed to FIGS. 3 and 3A which respectively depict the base 22 and sub-base 24 after the surfaces thereof have been laser etched with various reference marks and data, but before the segment blocks 1-12 have been installed thereon. Each and every line or indicia shown on the surfaces of the base 22 and sub-base 24 have been laser etched in accordance with the method of the present invention. The laser etching technique, carried out under computer control results in reference marks and data information which are not only highly accurate but easily readable since the width of the etching laser beam, and thus the etched reference marks may be precisely controlled. The X lines are highly readable as a result of the laser beam having carbonized and thus blackened those areas of the surface upon which the beam impinges. In addition to the various reference marks and data etched on the surface of the base 22 shown in FIG. 1, there is also etched a plurality of perpendicular, vertical and horizontal reference lines, 48 and 50 respectively, a border 52, tangent lines 54, segment block square lines 56, segment block labels 58, segment midpoint lines 60, segment square lines 62, segment center lines 64, outside and inside reference lines representing the outside permissible position of the tube 46, and segment miter lines 70. The adjacent pairs of tangent lines 54 mark the boundaries of the radius of the bends in the tube 46 defined by the references standard and set out in table 26. The pairs of segment block square lines, e.g. 56, 62 extend perpendicular to the center line 64 and mark the opposite ends of each of the segment blocks 1-12. The segment miter lines 70 indicate the angles of the mitered outer ends of certain of the segment blocks where bends in the tube 46 are present. The various reference lines mentioned immediately above facilitate rapid, highly accurate placement of the segment blocks 1-12 on the base 22 (and sub-base 24) during the assembly process.

Figure 5:
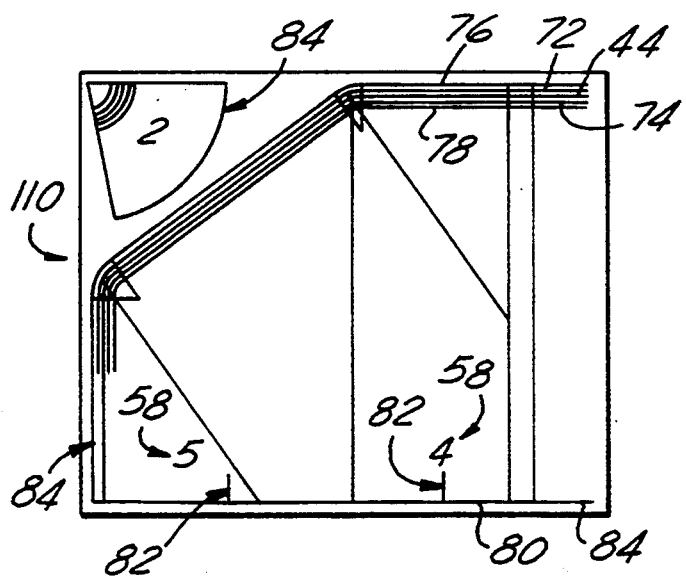
FIGS. 5 and 6 respectfully show a pair of gauge block blanks after laser etching, each including a pair of gauge block segments.
Figure 6:
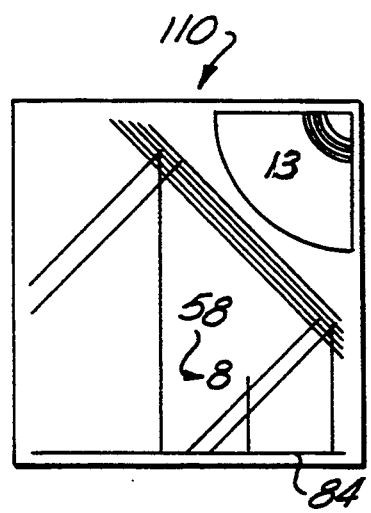

Attention is now directed to FIGS. 5 and 6 which respectively depict a pair of block blanks 110 on which various reference marks and indicia have been laser etched to define future segment blocks. Specifically, the blank 110 shown in FIG. 5 includes segment blocks 2, 4, and 5 while the blank 110 of FIG. 6 depicts segment blocks 8 and 13. As will be discussed later in more detail, after the blanks 110 are laser etched in the manner shown in FIGS. 5 and 6, the respective segment blocks 1–12 are individually cut out from the blanks 110 and machined to their final shapes. As particularly shown in FIG. 5, the following reference lines are laser etched to follow the length of the tube 46: reference line 44 corresponds to the center of the tube 46; reference lines 72 and 74 depict the normal upper and lower lines of the tube 46; and, reference lines 76 and 78 respectively depict the upper and lower outer tolerance boundaries of the tube 46 when it is installed in the gauge. Additionally, a segment block base line 80 defines the eventual bottom edge of the segment block 1–12, and an outer border line 84 is provided to define the remaining, finished outer boundary of the segment block. Segment block midpoint lines 82 are provided along the base line 80 which are intended to be lined up with the segment midpoint line 60 on the base 20 and sub-base 24.

The sub-base 24 shown in FIG. 3A is laser etched in a manner similar to that employed for the segment blocks 1–12. Note that the sub-base 24 includes an outer border line 86 as well as a finish base line 88.

Having described the basic components of the gauge 20, a method of manufacturing it will now be discussed. It is first necessary to obtain a set of X, Y, Z coordinate data as well as various information regarding bends in the tube as well as the tube diameter. This information is developed from a theoretical reference standard or an actual master part (tube) which is used as the reference standard. Normally, this information is provided either in the form of a simple table, such as the table 26 in FIG. 4 or by way of a drawing which defines the reference standard. This reference data is loaded into a computer program which generates all of the information which is necessary to laser etch the base 22, sub-base 24 and segment blocks 1–12, including data such as the total center line length of the part, rotational bend angle data, bend plane mathematical data, etc. The tube bend data processed by the program assists in determining whether errors are present in the original input data. For example, errors in the original data calling for negative tangent distances may result in overlapping bends without any straight section therebetween.

In any event, the computer program then designs the gauge by selecting the shapes of the segment blocks 1–12 and their placement on the base 20 and sub-base 24. The program determines the nature and placement of the various etched reference marks, intersect points, block shape, placement of the segment blocks, and actual tube contour to be etched on the blocks. In effect, the program designs the various components of the gauge 20. The output of the program may be loaded into a CAD file in order to generate three-dimensional views of the gauge 20 and its various component parts, or alternatively, the output may be directly located into a CNC post-processing system, which will be discussed momentarily. The CAD output typically provides a two-dimensional hard copy view of the base and the blanks which include the segment blocks, essentially identical to FIGS. 3, 5 and 6 herein. One CAD system suitable for use in connection with the present invention is AUTOCAD Ver. 10.0 (DOS Version).

Having essentially designed the gauge 20 and its component parts using the computer program, the next step in the process is to rough cut a plurality of blanks from which the base 20, sub-base 24 and each of the segment blocks 1–12 will be formed. In some cases, as shown in FIGS. 5 and 6, a single blank block 110 may include more than a single segment block. The blank containing the base 20 is positioned in a known attitude on top of a stationary base 96 adjacent a conventional CNC controlled laser 90. The laser 90 may comprise a commercially available system, such as a Model OM 100 available from Robin Sinar of Plymouth, Mich., which employs a profile motion system manufactured by Laser Lab Limited of Cheltenham, Victoria, Australia and a Series 2000 CNC controller from Anca USA of Novi, Mich. The laser 90 includes a laser beam head 94 mounted for movement in a first axis of movement on an arm 92 which is in turn mounted on the frame of the laser 90 for movement along a second axis, perpendicular to the first. Thus, the laser head 94 from which a laser beam emanates downwardly toward the base 96 is movable under computer control in a plane which is substantially parallel to the top surface of the gauge blank base 20. Under CNC control, the laser 90 etches all of the various lines on the top surface of the base 20, which are depicted in detail in FIG. 3, as previously discussed. The laser beam penetrates and etches the wood (or other material of which the base is formed) to a depth of approximately 10/1000 to 40/1000 of an inch deep, and approximately 8/1000 of an inch wide.

Figure 8:
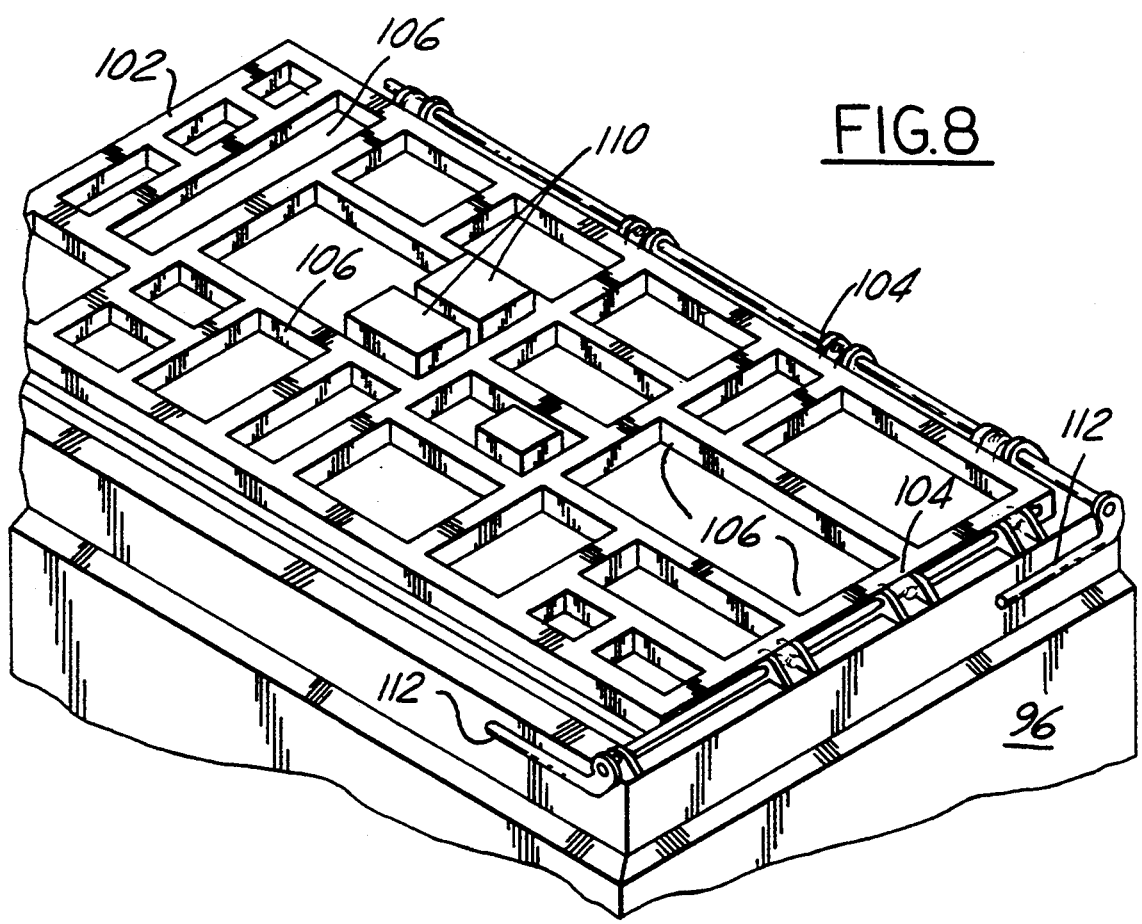
FIG. 8 is an enlarged, perspective view of the support bed and ready board used in the laser etching step, and depicting several gauge block blanks positioned ready for etching.
Figure 9:
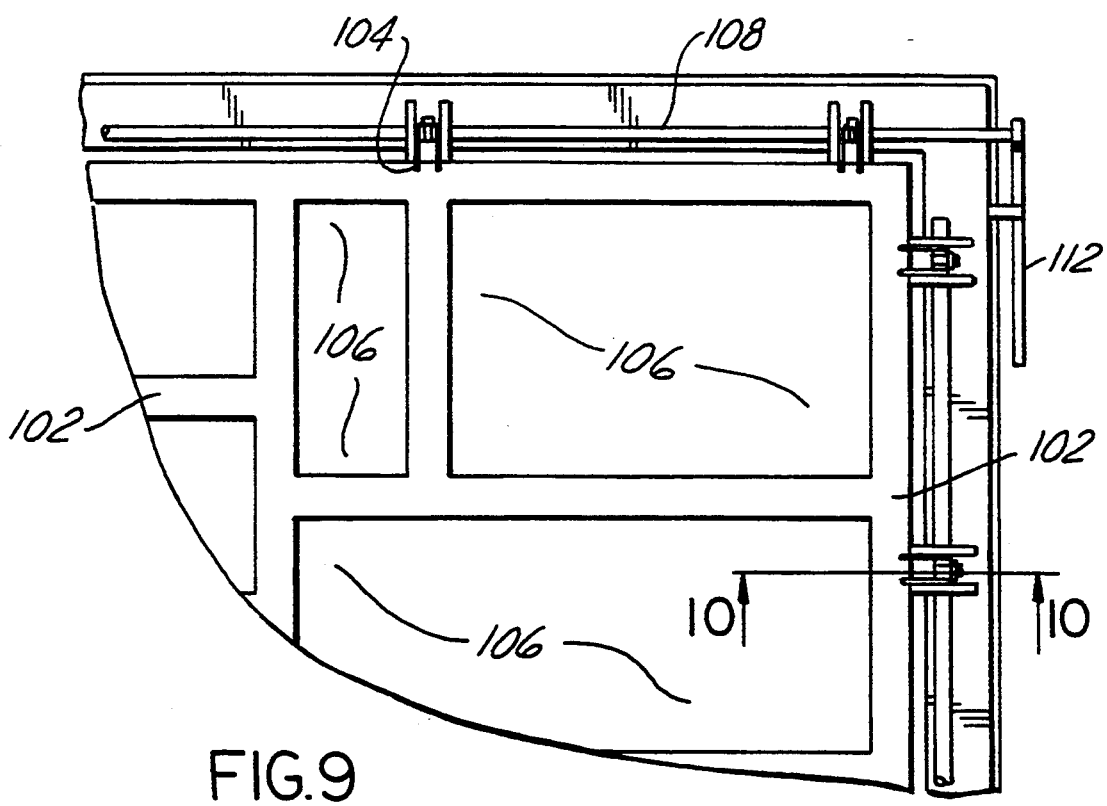
FIG. 9 is a fragmentary, plan view of a corner of the bed and ready board shown in FIG. 8, and better depicting the means for clamping the ready board in a fixed position.
Figure 10:
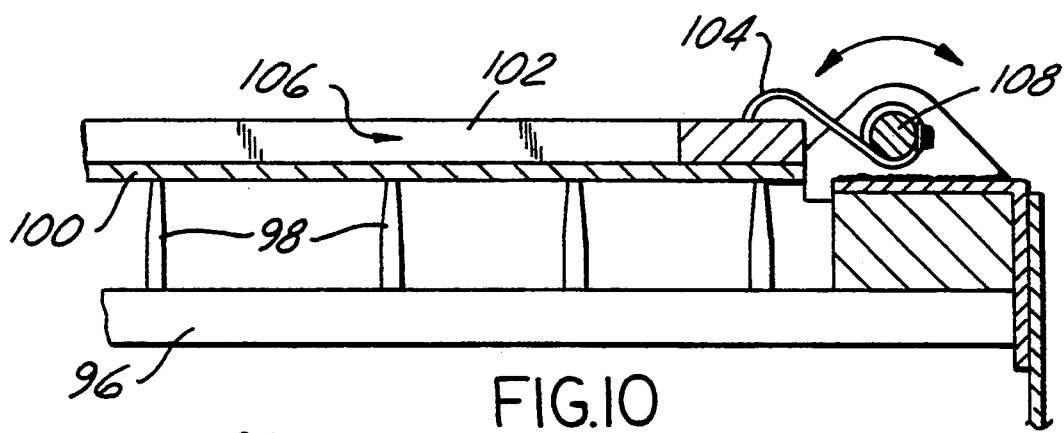
FIG. 10 is a cross-sectional view taken along line 10—10 in FIG. 9.

Having laser etched the base 20, it is then necessary to laser etch the various reference marks and data on the blank segment blocks 110, and in this connection reference is also now made to FIG. 8–10. Upon the table 96 there is provided a plurality of spacers 98 which elevate and support an underlay board 100. Mounted on the underlaid board 100 is a generally rectangular ready board 102 having a plurality of differently sized rectangular openings 106 therein. The periphery of the ready board 102 is clamped downwardly onto the table 96 by means of clamps 104 mounted on pivot rods 108 which are controlled by clamp handles 112. The openings 106 are cut out using precise machining techniques, such as by laser machining so that the openings 106 are precisely located in known relationship to each other, and thus can be accurately related to the spatial coordinate system used by laser 90. The size, placement and arrangement of the openings 106 may be derived empirically on a "best fit" basis so as to accommodate receipt of blank segment blocks 110 which are to be used in the manufacture of various types of gauges.

The ready board 102 is carefully positioned on the table 96 so that reference features on the board 102, such as one or more corners of the openings 106 are aligned and positioned in known relationship to the reference axis coordinate system used by the laser 90. Next, the blanks segment blocks 110, as well as the sub-base 24, are placed within the openings 106 such that two adjacent edges of each of the blank segment blocks 110 engage two interior side walls of the ready board 102 within one of the openings 106, thereby aligning the blanks 110 with the coordinate system of the laser 90. The nesting arrangement of the blanks within the various openings 106, and the choice of which openings 106 the blanks are placed in is predetermined by the previously discussed computer program, which typically outputs a drawing showing how the operator is to place and arrange the blanks 110 on the ready board 102. It should be noted here that the choice of location of the placement of the segment blocks 110 on the ready board 102 does not necessarily bear any relationship to the order or placement of the segment blocks 1–12 on the gauge base 20. Also, it should be noted that blank segment blocks 110 for a plurality of different gauges may be processed simultaneously. In other words, blanks 110 for several gauges may be placed within openings 106 in the same ready board 102 and then successively etched by the laser 90 in a single "batch".

Under computer program numerical control (CNC) the laser 90 then etches the various reference marks and data on the blank segment blocks 110, as previously discussed in detail. The next step in the manufacturing process involves the use of a saw or similar cutting device to cut closely to but not on the border lines 84, which results in separation of multiple segment blocks from the blanks 110 and yields a rough cut of the individual segment blocks 1-12; the laser 90 may also be employed for performing these same cutting operations. A further machining step is then employed, such as sanding or routing up to and into the laser etched border lines which, it will be recalled, are typically about 8/1000 of an inch wide. Final machining along the laser etched border lines 84 is performed under visual inspection which is facilitated by virtue of the fact that the laser etched lines are blackened by the etching process and thus easily visible and the machining operator can actually see the laser etched border line begin to "fall away" during the machining process, thus confirming that the machining tool is within 4/1000 of an inch from the theoretical center line of the laser etched border 84, i.e. within the 8/1000 of an inch width of the border line 84.

The next step in the manufacturing process involves fitting the segment blocks together and mounting them on the Gauge base 20 and sub-base 24. The segment blocks 1-12 are typically attached to each other by means of a joint, and in the case of an angle, a miter joint. The particular manner in which the segment blocks 1-12 are attached to each other naturally depends upon the precise Geometrical configuration of the gauge being made. The precise final features such as metered corners and the like can be confirmed for accuracy by simply placing the segment block on the Gauge base 20 and verifying that the features of the block correspond and are aligned with the laser etched lines, e.g. miter line 70, on the Gauge base 22. The individual segment blocks 1-12 having been fitted together and the support blocks 40, 42, etc. having been installed, the next step in the process involves mounting the segment blocks 1-12 on the gauge base 22. This is accomplished, as previously discussed, using adhesives and/or screws extending through the bottom of the gauge base 20 upwardly into the individual segment blocks 1-12. The segment blocks 1-12 may be cut at the tangent lines to allow the radius profile blocks to be inserted.

Figure 11:
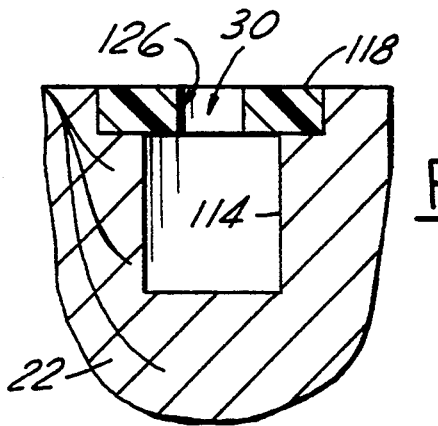
FIG. 11 is a cross-sectional view taken through one of the alignment apertures in the gauge base.
Figure 12:
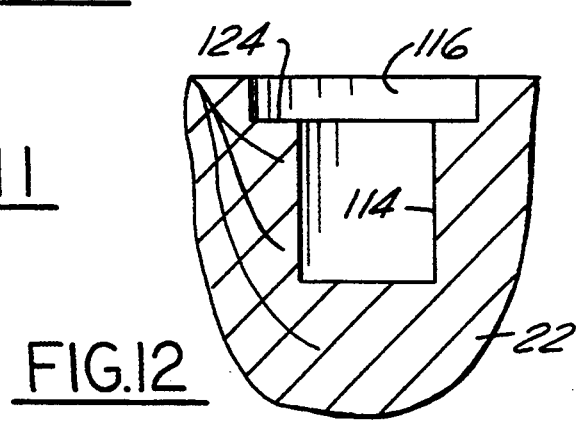
FIG. 12 is a view similar to FIG. 11 depicting a preliminary step in forming the aperture in the gauge base.
Figure 13:
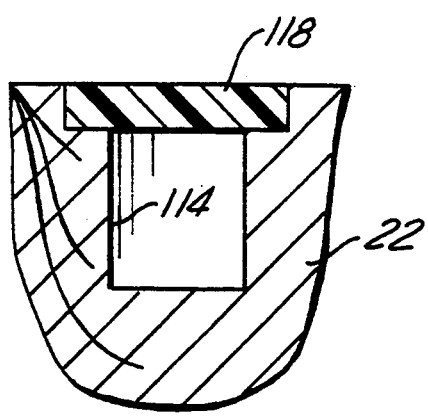
FIG. 13 is a cross-sectional view similar to FIG. 12 but depicting a subsequent process step.

Following assembly, the various features of the gauge 20 may be certified by use of a coordinate measuring machine (CMM) or the like. In this connection, the provision of the axis origin and axis alignment holes 30, 32 provides a simple and reliable means of aligning the Gauge relative to the coordinate system of the CMM. As best seen in FIG. 11, the axis origin and axis alignment holes 30, 32 each comprise a vertical, cylindrically-shaped opening in a circular insert 118, wherein the cylindrical side wall 126 has been precisely machined. The alignment holes 30, 32 are preferably formed in the following manner and reference is now made to FIGS. 12-14. First, a circular bore 114 is machined in the base 22, following which a concentric counterbore 116 is formed to define an annular shoulder 128. A circularly shaped, blank 118 formed of a material of high dimensional stability is secured as with adhesives within the counter bore 116, resting on the annular shoulder 128.

Figure 14:
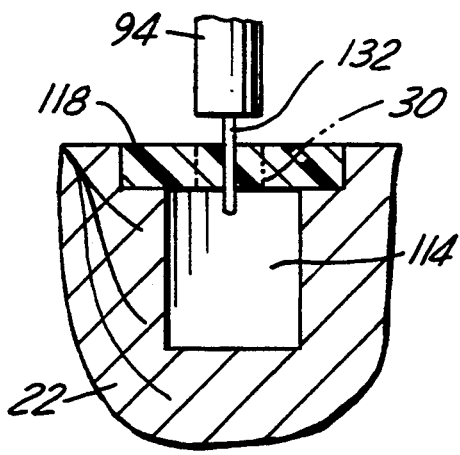
FIG. 14 is a cross-sectional view similar to FIG. 13 but depicting a still further processing step.
Figure 15:
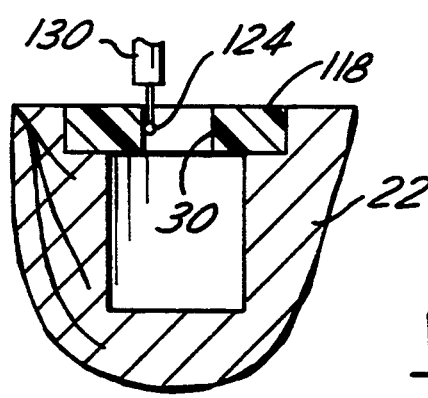
FIG. 15 is a cross-sectional view similar to FIG. 11 and depicting the positioning of a probe within the reference axis alignment aperture during the process of establishing the reference axis.
Figure 16:
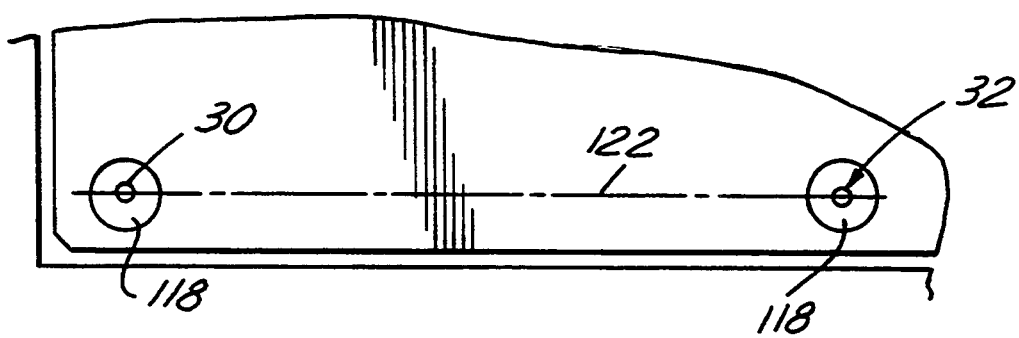
FIG. 16 is a fragmentary, plan view of one side of the gauge base showing the reference axis established through the centers of the reference axis alignment apertures.

During the previously described process of laser etching reference marks on the gauge base 22, or in a separate operation, the laser 90 is employed to machine the cylindrical alignment hole 30 in the blank insert 118; this step is depicted in FIG. 14 wherein the laser head 94 is positioned so as to direct the laser beam 132 downwardly to penetrate the blank 118. The alignment hole 30, 32 formed in this manner is thus precisely located in known relationship to the other laser etched reference marks on the base 22 as well as the individual segment blocks 1-12. The translation values from the axis origin hole to the part datum are etched adjacent to the axis origin hole as well as the axis alignment direction arrows and alignment number.

During the certification process, the gauge 20 is placed on the table (not shown) of a CMM and a contact type probe tip 124 carried on an arm 130 is guided into the hole 30, 32. The probe tip 124 is then driven into contact with the cylindrical side wall 126 at a plurality of locations, typically four, around the circumference of the side wall 126. In this manner, the central axis of the hole 30 is precisely located. This same process is then employed to locate the central axis of the second alignment hole 32. The plane of the top surface of the gauge base is developed and located by the CMM, into which the axis origin and axis alignment holes are projected. The central axes of the two alignment holes 30, 32 having been ascertained, a reference axis 122 is therefore established which is subsequently used to align the spatial coordinate system of the CMM with the position of the gauge 20.

Figure 17:
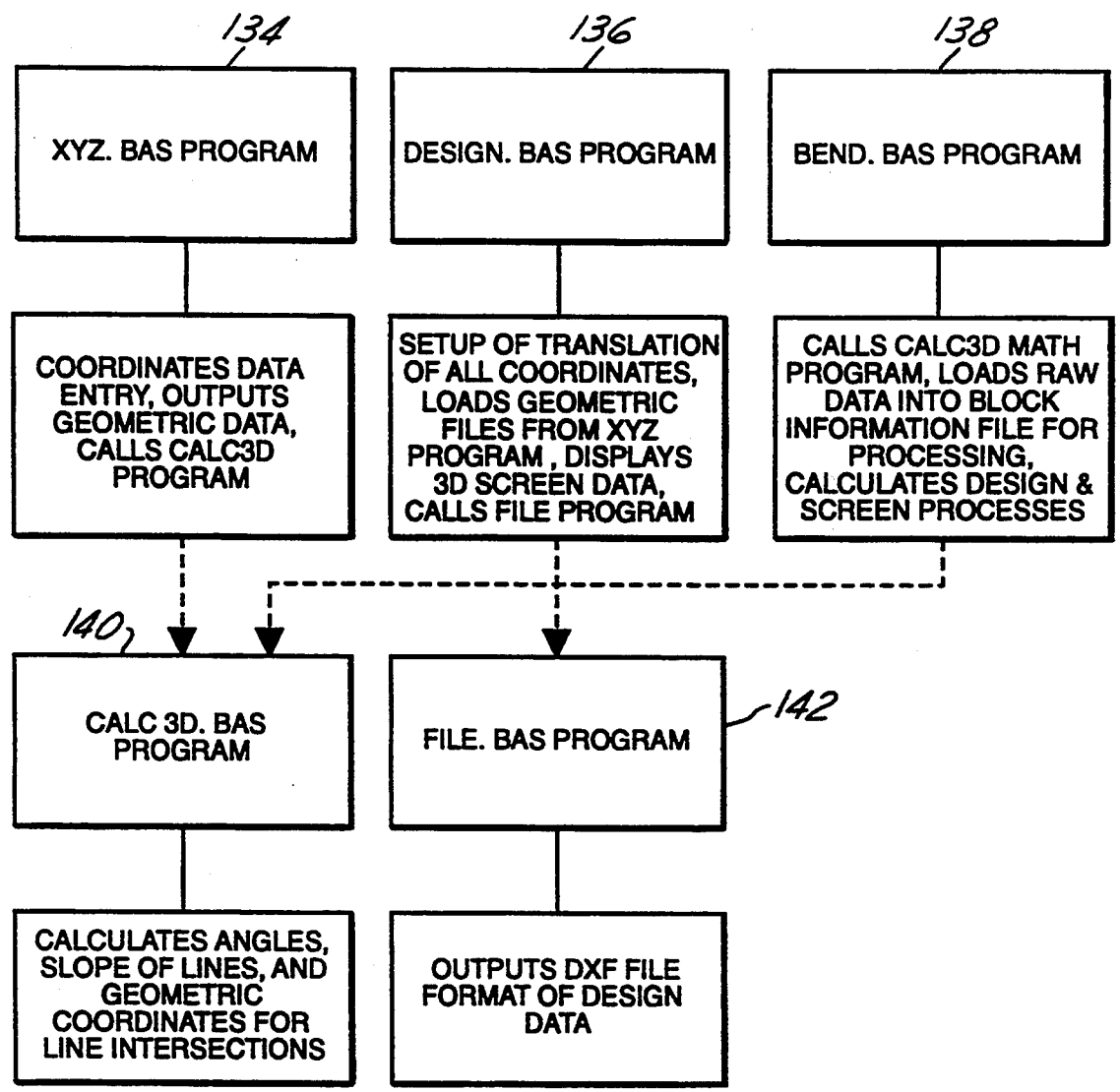
FIGS. 17–22 depict flowcharts for the computer program including the programmed set of instructions for controlling the laser etching process.

Reference is now made to FIG. 17 which is a combined block diagram and flow chart depicting the major routines of a suitable computer program for generating the necessary programmed set of instructions for controlling the above described laser etching process. The following description illustrates a typical program written in the QUICK BASIC language and is intended to be merely illustrative of many different programs that could be devised to carry out the laser etching process of the present invention. Broadly, the overall program comprises a XYZ.BAS Program 134, a DESIGN.BAS Program 136, a BEND.BAS Program 138, a CALC3D-.BAS Program 140, and FILE.BAS Program 142. The XYZ.BAS Program 134 coordinates data entry, outputs geometric data and calls up the CALC3D.BAS Program 140. The DESIGN.BAS Program 136 sets up translation of all input coordinates, loads geometric files from the XYZ.BAS Program 134, displays the CALC3D.BAS Program 140 screen data and selectively calls up operation of the FILE.BAS Program 142. The BEND.BAS Program 138 calls up the CALC3D.BAS Program 140, loads raw data into a block information file for processing and calculates design and screen processes. The CALC3D.BAS Program 140 calculates the angles, slope of lines, and geometric coordinates for line intersections. Finally, the FILE.BAS Program 142 outputs DXF (drawing exchange format) file format of design data. The output of the DXF formatted design data from the FILE.BAS Program 142 is fed to a conventional CAD (computer aided design) system which then displays the gauge design in three dimensions.

Figure 18:
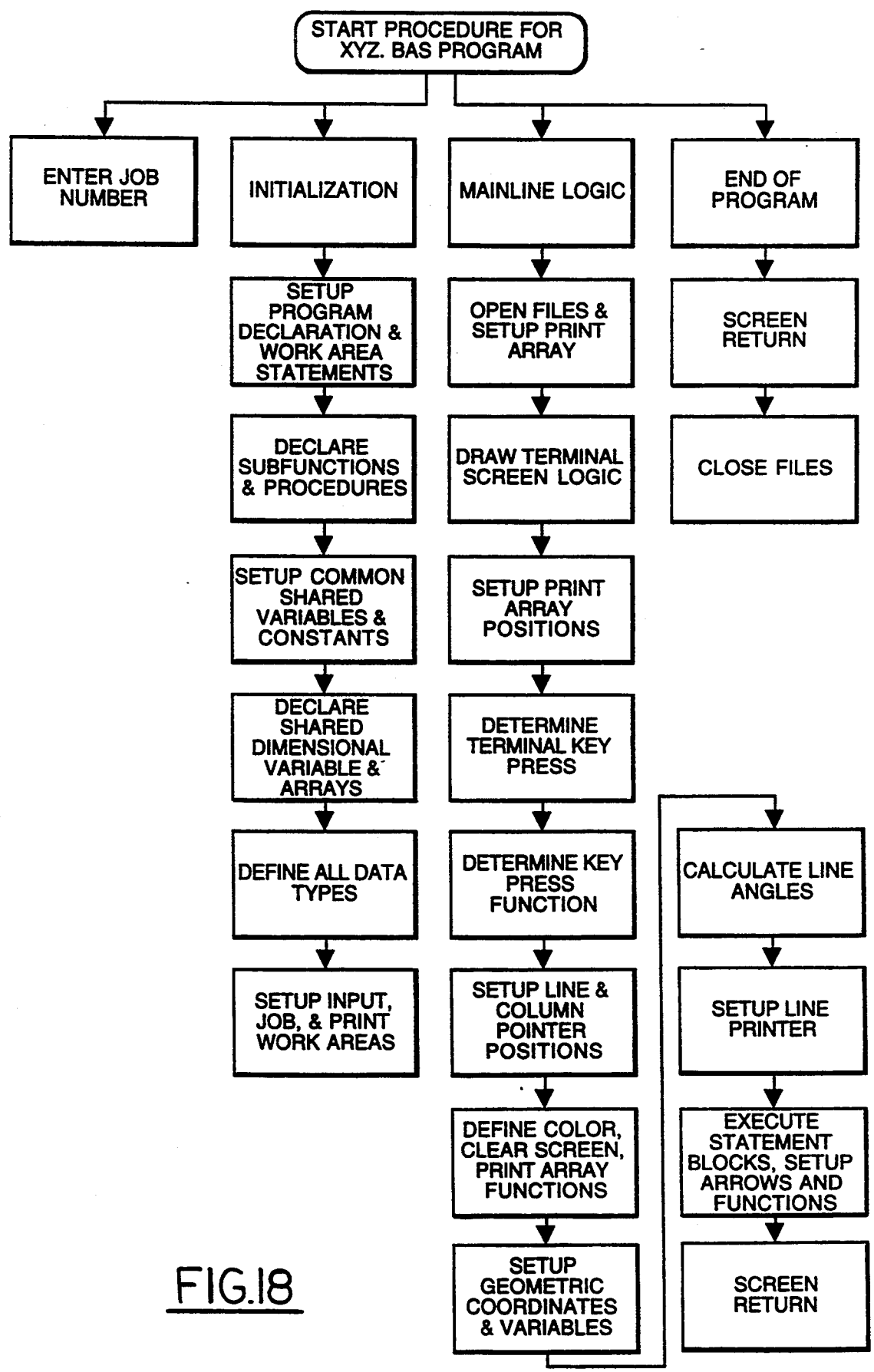

FIG. 18 is a flow chart for the XYZ.BAS Program 134. Referring now to FIG. 18, the first step in the XYZ.BAS Program 134 involves entering the job number, following which an initialization is performed. Then, program declaration and work area statements are set up, subfunctions and procedures used within the program are declared, the variables and constants that will be shared by different modules and subroutines within the program are set up and the shared dimensional variables and arrays are declared. Data types are then defined, and the final step of initialization involves setting up input, job and print work areas. At this point, the mainline logic is commenced by first opening up files and setting up the print array. Then, terminal screen logic is drawn and print array positions are set up. Next, a determination is made of whether or not a terminal key is pressed. Upon detection of the depression of a terminal key, line and column pointer positions are set up with respect to the XYZ coordinates for the program. Color, clear screen, and printer array functions are then defined following which geometric coordinates and variables are set up. At this point, the line angles are calculated, the line printer is then set up and subroutines are performed to execute statement blocks and set up arrows and functions. Finally, the program returns to the screen functions and files are closed to end the program, thus completing the procedure for entering the coordinates.

Figure 19:
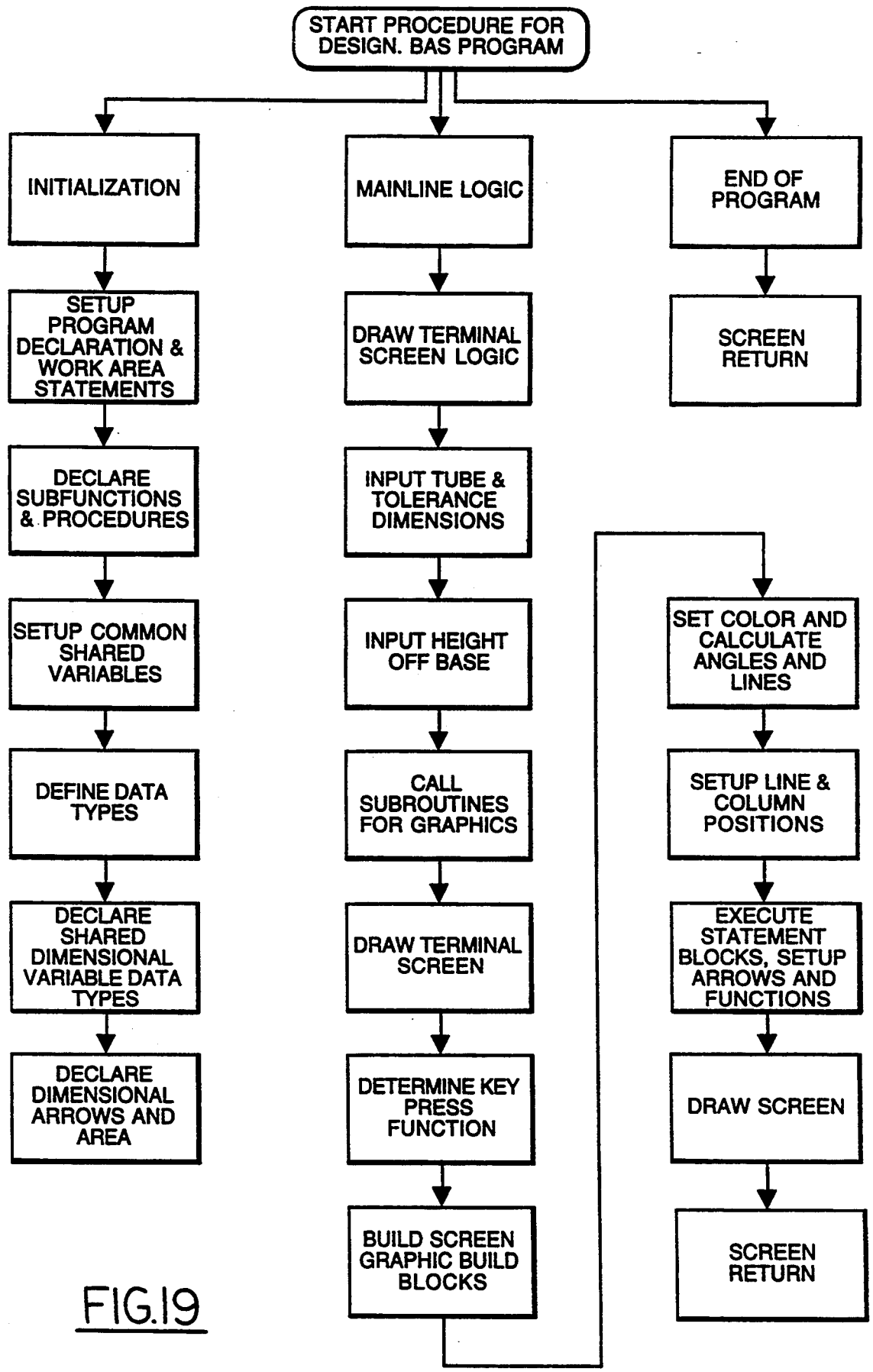

Attention is now directed to FIG. 19 which depicts a flow chart for the DESIGN.BAS Program 136. Initialization is commenced by setting up program declaration of work and work area statements, following which subfunctions and procedures are declared. Common shared variables are set up, the various data types are defined, shared dimensional variable data types are declared, and finally dimensional variable data types are declared. Having initialized the program, the mainline logic is commenced which involves drawing the terminal screen logic, inputting tube and tolerance dimensions, inputting the height off of the base information, calling subroutines for graphics, drawing the terminal screen and determining key press functions, i.e., whether or not a terminal key has been pressed. Next, screen graphic build blocks are generated, following which angles and lines are calculated and the color of various screen features is set. Next, line and column positions are set up, statement blocks are executed, arrows and functions are set up, and the screen is drawn. Finally return is made to the screen, thus ending the program.

Figure 20:
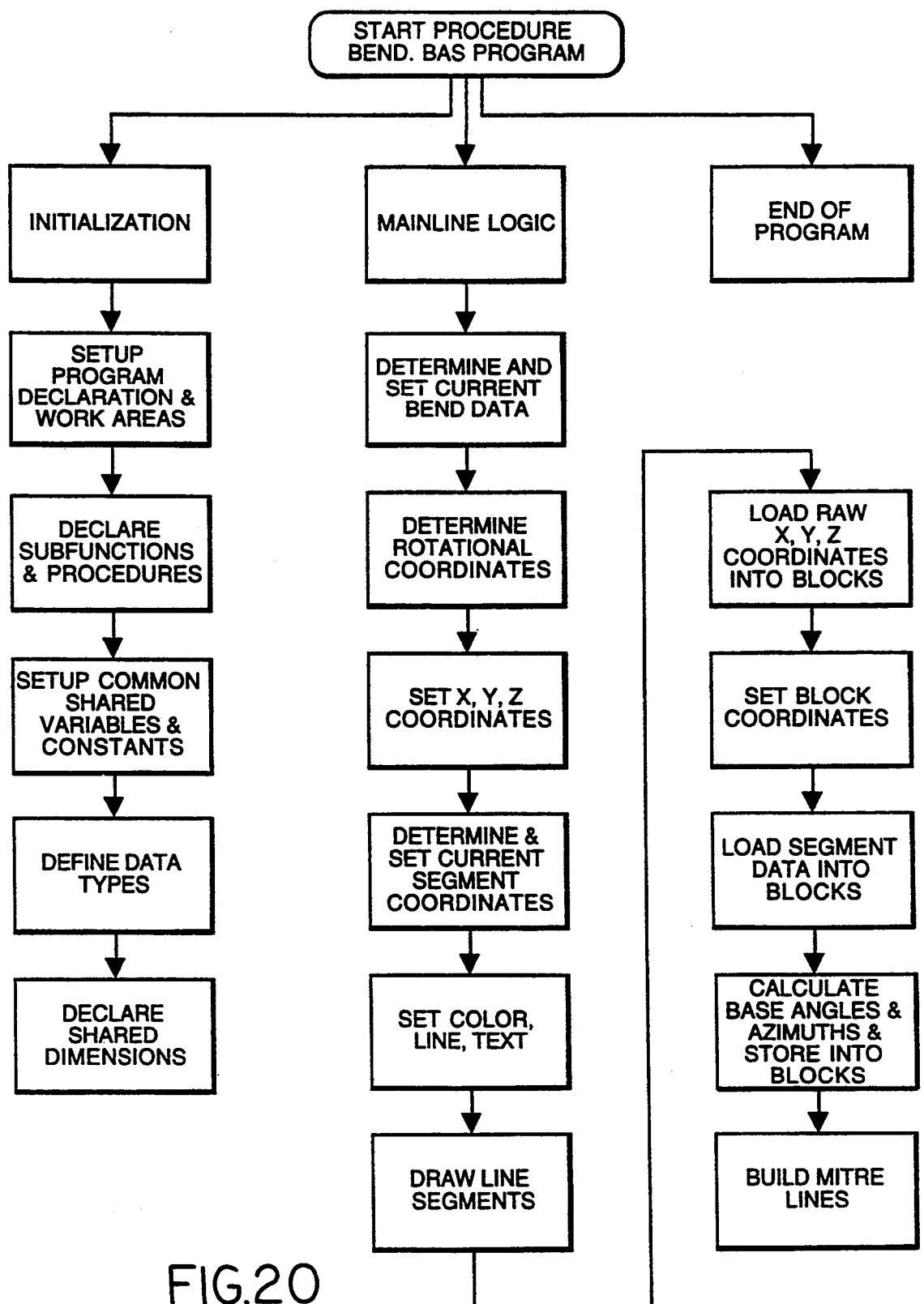

Attention is now directed to FIG. 20 which depicts a flow chart of the BEND.BAS Program 138. The program is initialized by setting up program declaration and work areas, declaring subfunctions and procedures, setting up common shared variables and constants, defining data types and, finally declaring shared dimensions. The mainline logic is then commenced which first involves determining and setting the current bend data. Next, the rotational coordinates are determined, the X, Y and Z coordinates are set and the current segments are then determined and set. The color, line and text is then set, line segments are drawn and the raw X, Y and Z coordinates are loaded into block information files. The block coordinates are then set, the segment data is loaded into the block information file and a calculation is then made of the base angles and azimuths and this calculated information is stored into block information files. Finally, the miter lines of the blocks are built, following which the program is ended.

Figure 21:
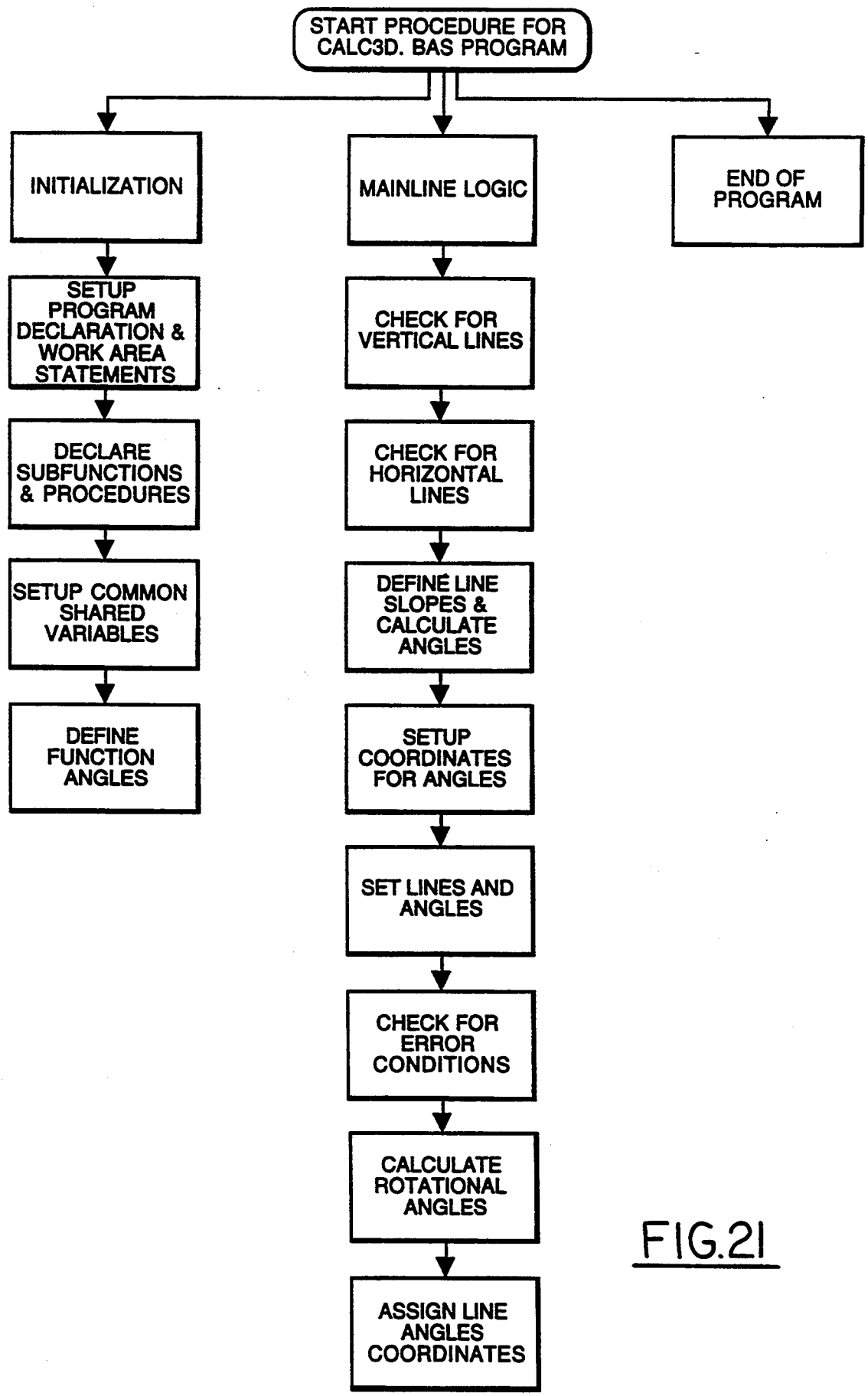

Attention is now directed to FIG. 21 which depicts a flow chart of the CALC3D.BAS Program 140. The program is initialized by first setting up program declarations and work area statements, declaring subfunctions and procedures, setting up common shared variables and defining function angles. Mainline logic is first commenced by checking for vertical lines, then checking for horizontal lines, defining the line slopes and calculating the angles of these slopes, setting up coordinates for the angles and then setting up the lines and angles. A check is then made for any error conditions that may exist so that errors may be detected before the component parts of the gauge are cut and etched. This error check will also reveal any mathematical errors. The rotational angles are then calculated following which line angle coordinates are assigned, and thereafter the program is ended.

Figure 22:
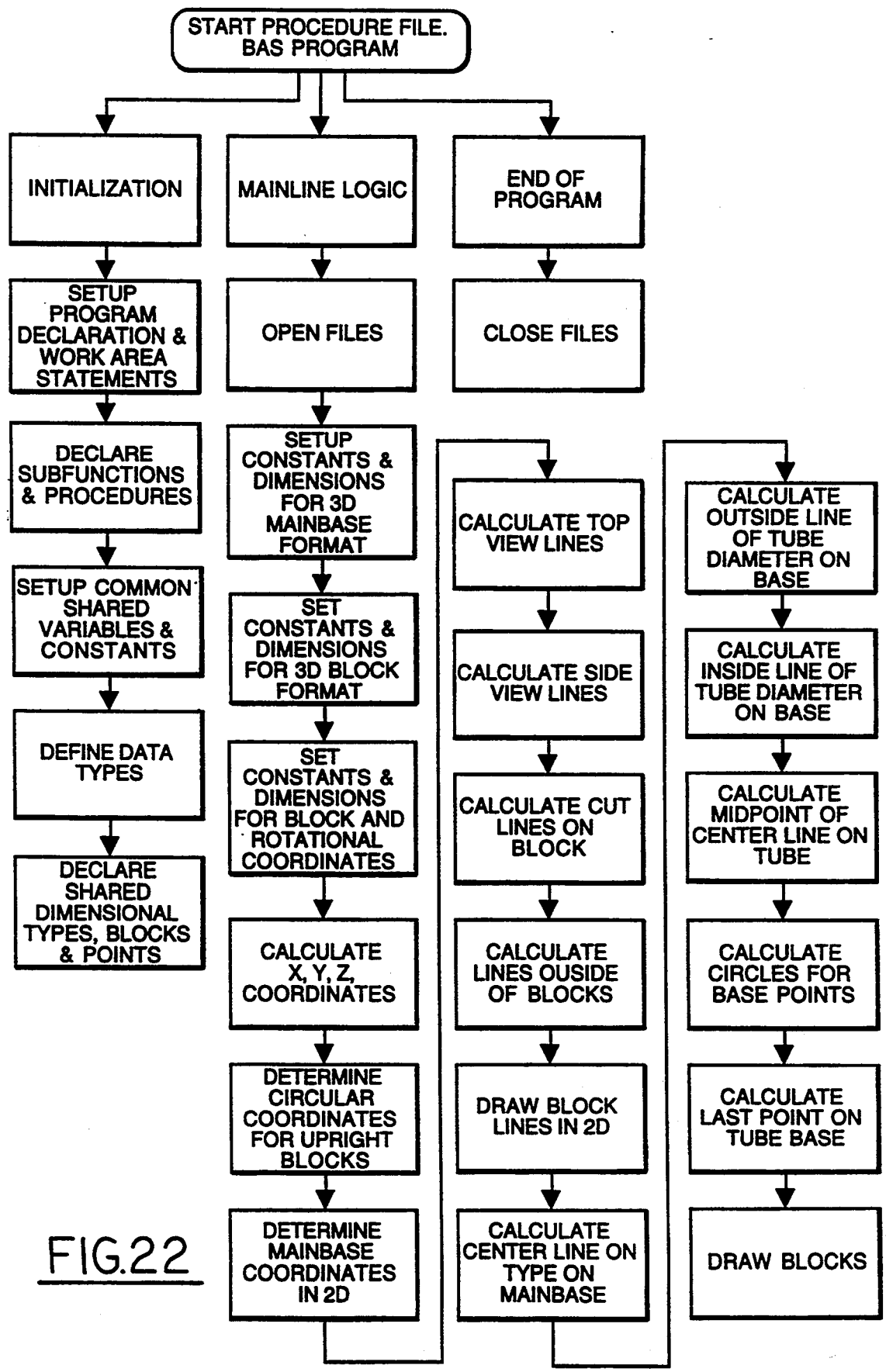
Figure 23:
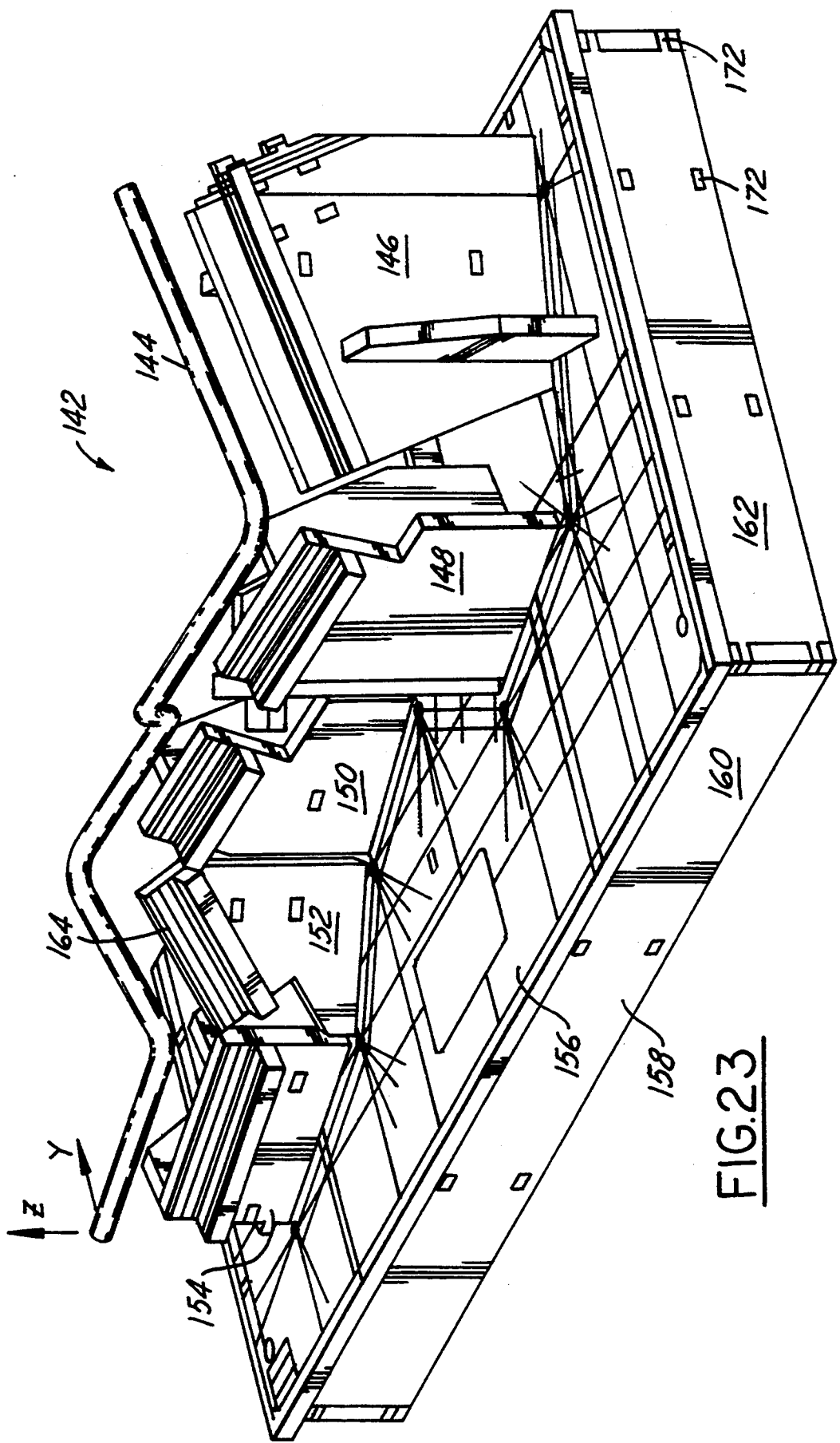
FIG. 23 is a perspective view of a fixture-type gauge which forms an alternative embodiment of the present invention, with a tube to be checked shown immediately above its resting, checking position in the gauge.

FIG. 22 depicts a flow chart for the FILE.BAS Program 142 which is called up by the DESIGN.BAS Program 136. Initialization is performed by setting up program declaration and work area assignments, declaring subfunctions and procedures, setting up common shared variables and constants, defining data types, and finally declaring shared dimensional types, blocks and points. The mainline logic is commenced by opening appropriate files and then setting constants and dimensions for the three dimensional main base format followed by setting the constants and dimensions for the three dimensional block format. The constants and dimensions for the block and rotational coordinates are then set and a calculation is made of the X, Y and Z coordinates. Next, a determination is made of the circular coordinates for the upright blocks (i.e., where they will be placed). Next, the main base coordinates are determined in two dimensions, in relationship to a common datum, following which the top view lines on the base are calculated. The sideview lines for the individual blocks are then calculated following which the cut lines for these blocks are calculated. The lines outside of the blocks are then calculated; these latter mentioned lines are those rough cut lines on the blocks discussed earlier hereinabove. The block lines are then drawn in two dimensions following which the centerline and type on the main base are calculated. Then, the outside line of the tube diameter on the base is calculated, the inside line of the tube diameter on the base is calculated, the midpoint of the centerline of the tube is calculated, the circles for the base points are calculated, and finally a calculation is made of the last point on the tube base. Finally, the blocks are then drawn.

At this point, an entire output CAD file has been completed and may be input to an automated CAD system. All of the various components, bases and segment blocks, as well as the various reference lines, marks and data to be etched thereon, may be viewed on the CAD system and further manual changes, as desired, may be carried out. The output CAD file may be then be processed by any conventional, commercially available post processing software to convert this file data into a format suitable for controlling the above discussed laser which is CNC controlled. Suitable past processing programs are as follows: TOOLCHEST 6.0 available from TC Dynamics, Inc. of Dublin, Ohio; CLEARCUT 386 available from Anilam of Miami, Fla.; and MASTERCAM 386 of Tolland, Conn.

Figure 28:
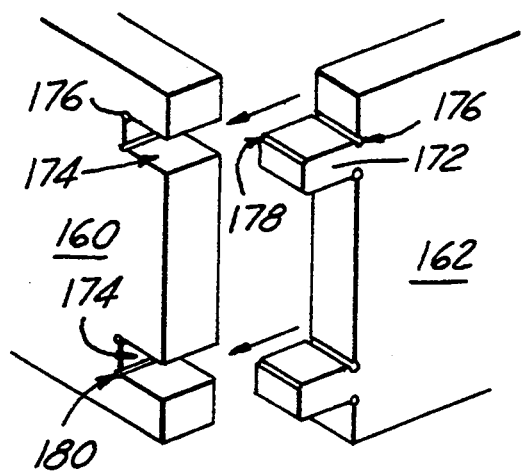
FIG. 28 is an enlarged, exploded view of a corner of the base shown in FIG. 25, and depicting the snap fit connections just prior to being assembled.
Figure 29:
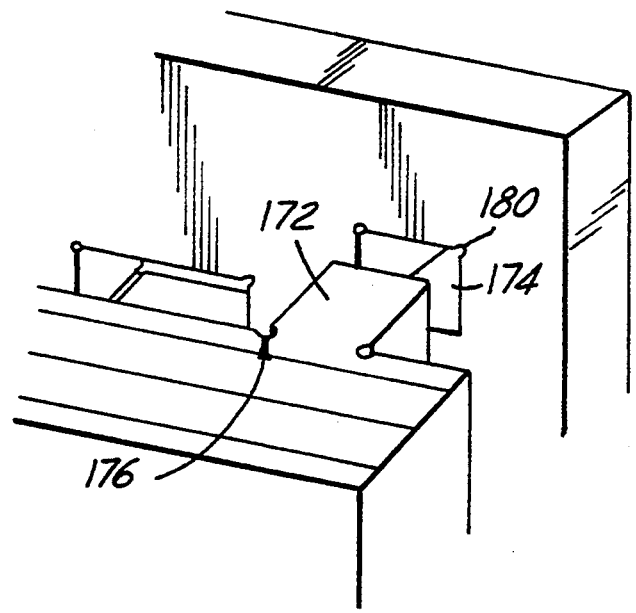
FIG. 29 is a perspective view of the snap fit interconnections between a segment block and the base; and, FIG. 30 is a exploded, perspective view depicting the relationship between a segment block, support block and tube supports.
Figure 30:
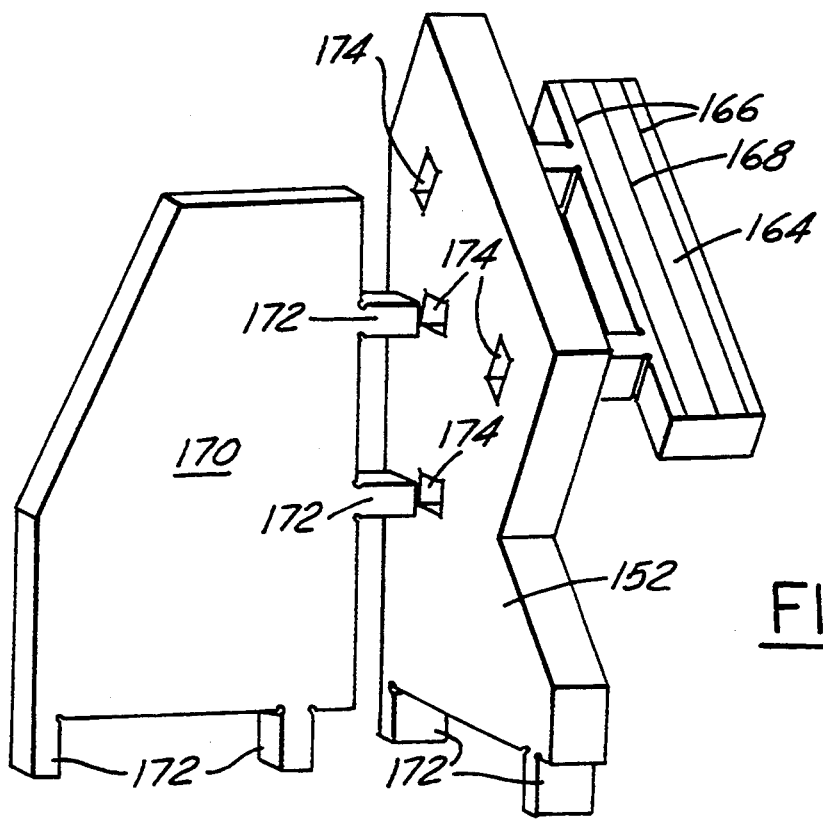

Attention is now directed to FIGS. 23–30, wherein an alternate form of a fixture type gauge 142 is shown, which further increases the ease of assembly, reduction of manufacturing time and increases accuracy. The gauge 142 broadly comprises a base assembly 158 comprising a plurality of interconnected members e.g., 160, 162 upon which there is mounted a planar top or base surface 156. The base members 160, 162 are all interconnected via later discussed snap fit connections comprising a male-like projection 172 and a corresponding, mating female-like receptacle or through hole 174. The base top 156 includes a plurality of the female openings 174 for receiving corresponding projections 172 on base 158 therein. In the case of interfitting corners, such as the corner between base components 160, 162, the through hole openings 174 may have one side thereof open as shown in FIG. 28.

As in the case of the previously described gauge fixture, the gauge 142 includes a plurality of segment blocks 146–154 as well as a plurality of tube support blocks 164 mounted thereon for supporting the tube 144. As perhaps best seen in FIG. 23, the gauge 142 further includes support braces 170 which interconnect with the segment blocks 146–154 to provide additional rigidity. The segment blocks 146–154 include male snap fit projections 172 which are received in corresponding openings 174 in the base top 156. Further, the segment blocks 146–154 include a plurality of the snap fit openings 174 which receive interconnect projections 172 on both the support braces 170 and tube supports 164. The tube supports 164 include marks designating the centerline 168 and outer tolerance boundaries indicated by the numeral 166. Following assembly, the component parts of the gauge 142 described above may be secured in place as with adhesives.

Figure 24:
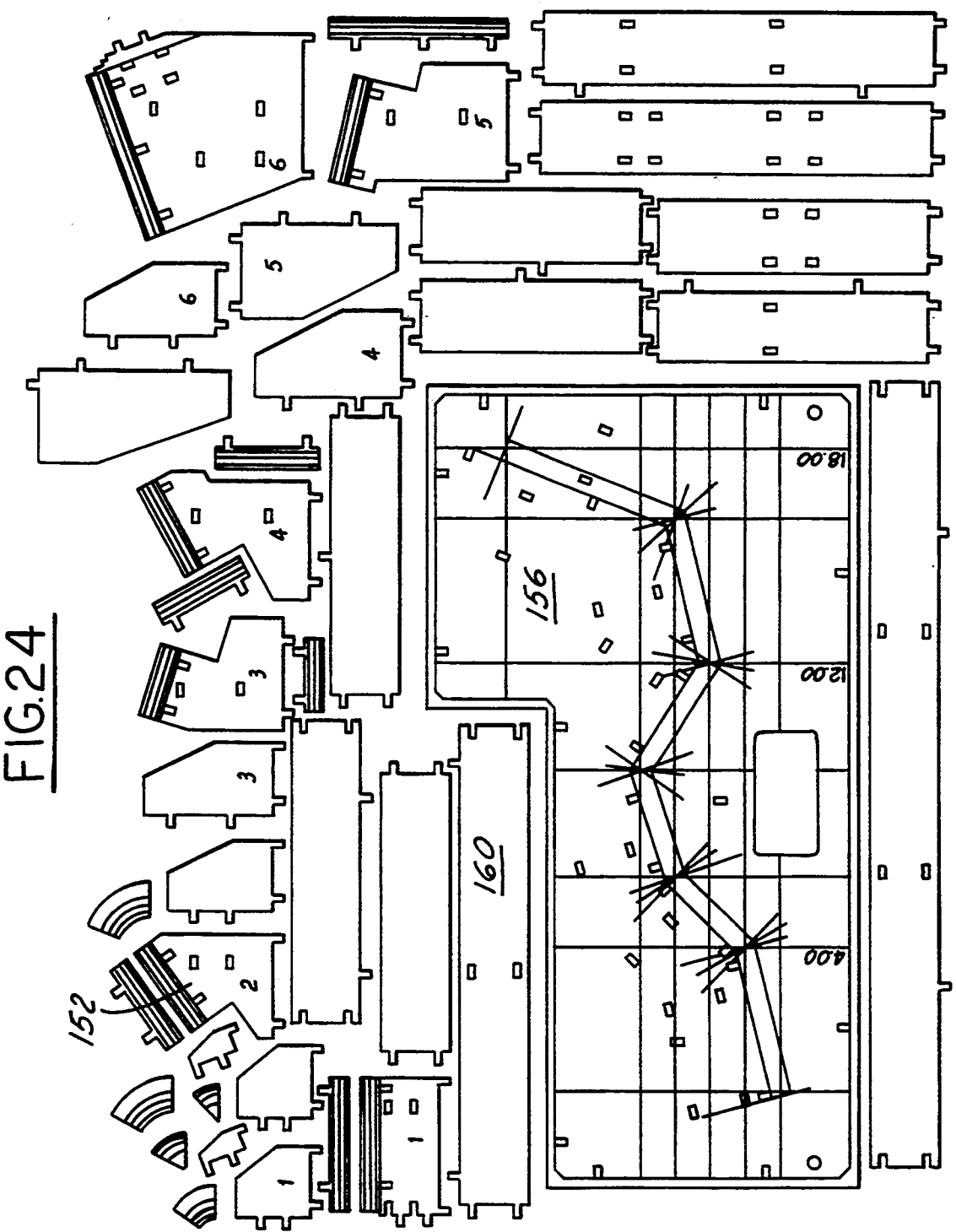
FIG. 24 is a plan view of the component parts of FIG. 23 depicted in the form they would be layed out and cut from a single blank of material.
Figure 25:
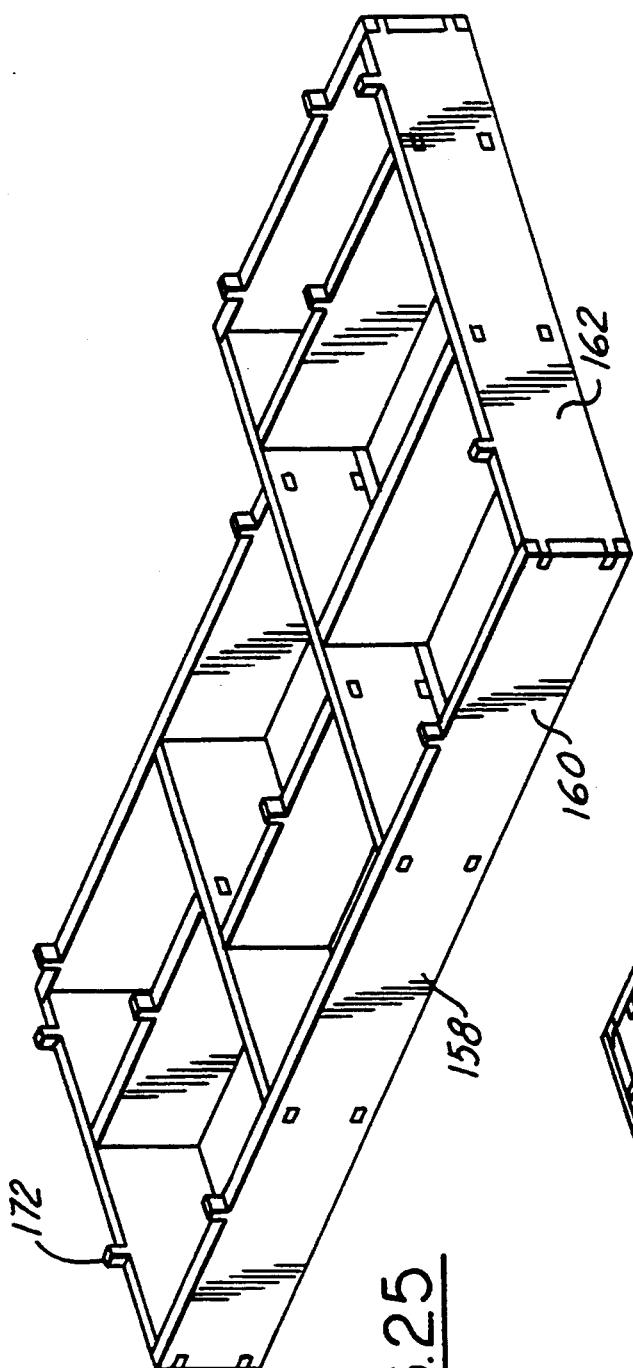
FIG. 25 is a perspective view of the underlying base portion of the gauge of FIG. 23.
Figure 26:
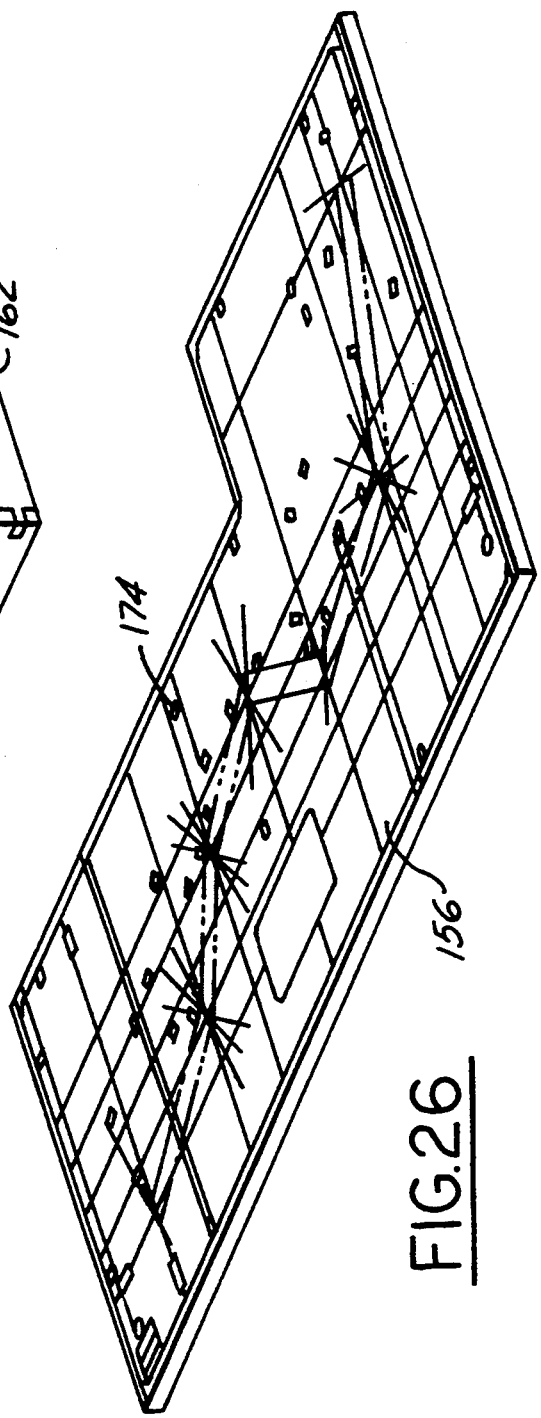
FIG. 26 is a perspective view of the upper surface of the base of the gauge of FIG. 23.
Figure 27:
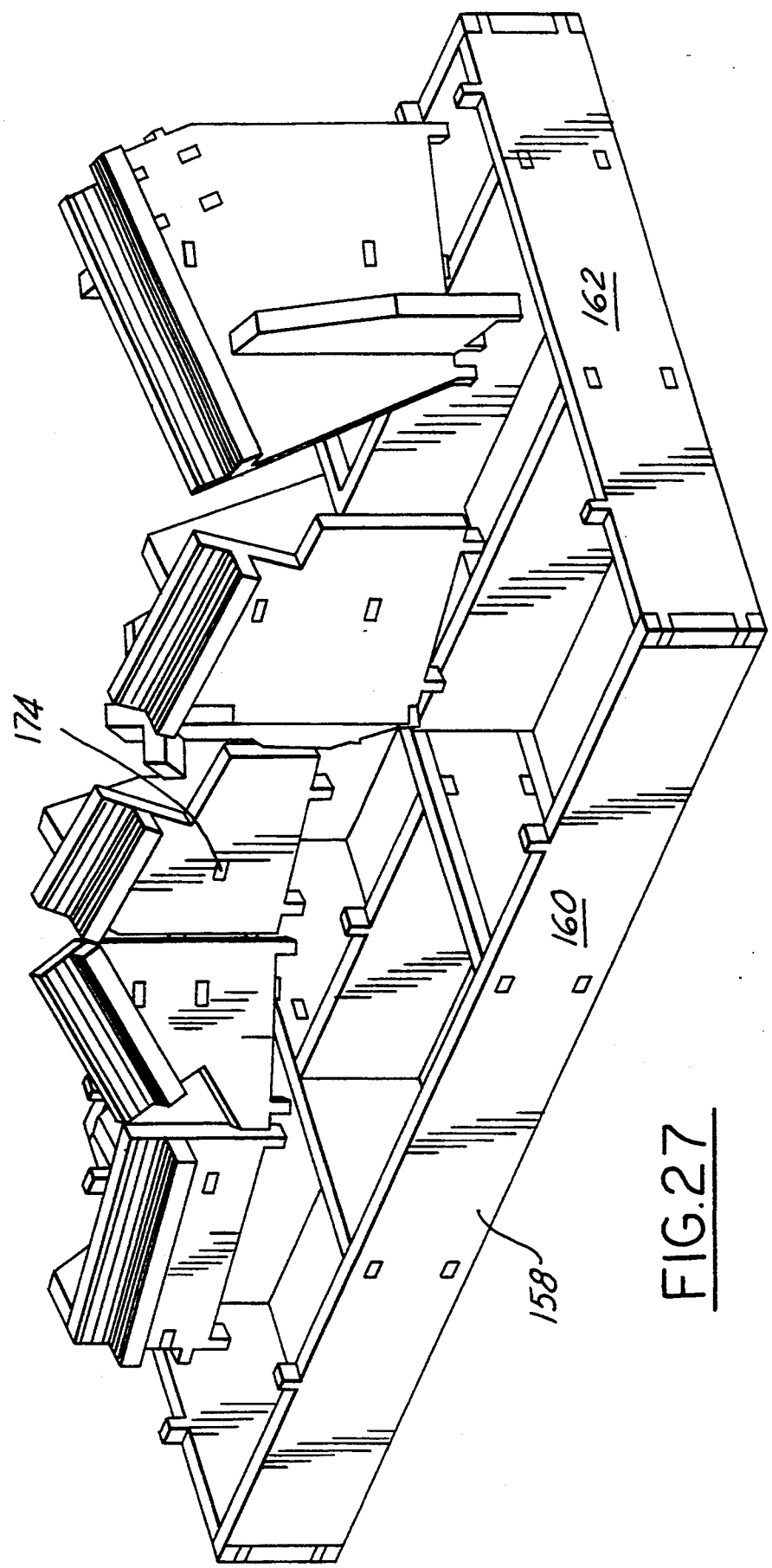
FIG. 27 is a view similar to FIG. 26 but showing the eventual position of the assembled segment blocks.

It should be noted here, that all of the component members of the gauge 142 are flat and may be cut from a single planar blank or sheet of material; a suitable layout for cutting out these flat members from a single planar blank is shown in FIG. 24. The parts may be cut from the blank using a laser cutter, water jet, mill, wire EDM or any other appropriate computer numerically-controlled machine, of the type generally previously described. The accuracy of the fit and placement of the component parts of the gauge 142 is further increased by virtue of the fact that the parts are cut using the same CNC machine, are cut at the same time and are cut from the same blank of material. It should be noted here that the component parts may be cut from any suitable material such as wood, plywood, die board, acrylic, ferrous and non-ferrous materials, composites, cardboard or any other suitable, rigid material.

As best seen in FIG. 28, the interlocking male projections 172 are preferably provided with radiused outer corners 178, and radiused or cut-out inner corners 176 such as fillets, in order to avoid interconnection interference with mating surfaces defining the female openings 174. In a similar manner, the female openings 174 may be provided with similar radius cuts 176 to avoid interference problems.

The snap fit connections of gauge 142 need not be provided with the laser etched alignment lines of the previously described gauge since the components are not aligned by reference to visual lines, but rather, instead, are simply aligned by inserting the male projections into the female interconnect openings; in other words, this arrangement provides for quick, self-alignment.

From the foregoing, it is apparent that the gauge and method of making same described above not only provide for the reliable accomplishment of the objects of the invention, but do so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. A method of manufacturing a gauge for comparing a part with a reference standard, comprising the steps of:
    (A) providing a set of spatial coordinates corresponding to said reference standard;
    (B) producing a programmed set of instructions using said set of spatial coordinates;
    (C) forming a plurality of component members of said gauge using a computer controlled machine operated by said programmed set of instructions;
    (D) providing the component members with interlocking male projections and female openings; and
    (E) assembling said component members into fixed relationships to each other consistent with the set of spatial coordinates.

2. The method of claim 1, wherein step (D) includes the step of inserting said male projections into corresponding said female openings.

3. The method of claim 1, wherein said step of forming interlocking male projections and female openings includes forming fillets and rounds on said projections and said openings.

4. The method of claim 1, wherein step (D) includes forming a gauge base consisting of said plurality of component members joined by inserting said male projections into corresponding said female openings.

5. A gauge assembly for comparing a part with a reference standard, comprising:
    a base; and
    a plurality of component members arranged to support said part thereon, said base and said component members including a plurality of interlocking male projections and female openings fixing said base and said component members in preselected spatial relationship to each other corresponding to said reference standard.

6. The gauge assembly as recited in claim 5, wherein said base includes a base assembly defined by a plurality of interconnected base members and a base surface mounted on said base members.

7. The gauge assembly as recited in claim 6, wherein each of said base members and said base surface is substantially planar.

8. The gauge assembly as recited in claim 7, wherein said base members include a plurality of interlocking male projections and female openings.

9. The gauge assembly as recited in claim 8, wherein said base surface includes a plurality of female openings and said base members include a plurality of male projections received in locking relationship within said female openings in said base surface.

10. The gauge assembly as recited in claim 8, wherein said base members are arranged so as to define a plurality of openings in said base assembly.

11. The gauge assembly as recited in claim 5, wherein said component members include a plurality of tube support blocks for supporting said part and a plurality of segment blocks for supporting said tube support blocks on said base, said segment blocks and said tube support blocks having a plurality of interlocking male projections and female openings fixing said tube support blocks on said segment blocks in preselected spatial relationship to each other.

12. The gauge assembly as recited in claim 11, wherein said male projections are located on said tube support blocks and said female openings are located on said segment blocks.

13. The gauge assembly as recited in claim 12, further including a plurality of support brace members for supporting said segment blocks on said base, said support brace members having a plurality of male projections and female openings fixing said segment blocks in preselected spatial relationships to each other.

14. The gauge assembly as recited in claim 13, wherein said male projections are located on said support brace members and said female openings are located on said segment blocks.

15. The gauge assembly as recited in claim 14, wherein said tube support blocks, said segment blocks and said support brace members are substantially planar.

16. The gauge assembly as recited in claim 5, wherein said base and said component members are substantially planar.

17. The gauge assembly as recited in claim 5, wherein said interlocking male projections and said female openings include fillets and rounds on corners to avoid interconnection interference between said projections and said openings.

18. The gauge assembly as recited in claim 5, further including a plurality of support brace members for bracing said component members on said base, and said support brace members having a plurality of interlocking male projections and female openings connecting said support brace members to said base and said component members.

19. The gauge assembly as recited in claim 18, wherein said male projections are located on said support brace members and said component members and said female openings are located on said component members.

20. A gauge assembly for comparing a part with a reference standard, comprising:
a base assembly including a plurality of base members and a plurality of interlocking male projections and female openings on said base members for connecting said base members in fixed relationship to each other;
a base surface mounted on said base assembly, said base surface having a plurality of female openings for receiving corresponding male projections on said base assembly;
a plurality of segment blocks;
a plurality of support brace members;
a plurality of tube support blocks adapted to support said part; and
said segment blocks, said support brace members and said tube support blocks having a plurality of male projections and female openings fixing said segment blocks, said support brace members and said tube support blocks in a preselected spatial relationship to each other.

21. A method of manufacturing a gauge for comparing a part with a reference standard, comprising the steps of:
(A) cutting from a planar sheet of material a plurality of component members of said gauge nested in a best fit arrangement, including forming interlocking male projections and female openings integral with said component members;
(B) assembling said component members into predetermined spatial relationship with each other by inserting said male projections into said female openings; and
(C) securing said component members in said predetermined spatial relationship.

22. The method as recited in claim 21, including the step of laying out said component members in a best fit arrangement whereby material waste is minimized.

* * * * *